US008655476B2

(12) United States Patent
Wang et al.

(10) Patent No.: US 8,655,476 B2
(45) Date of Patent: Feb. 18, 2014

(54) SYSTEMS AND METHODS FOR COMPUTATIONALLY DEVELOPING MANUFACTURABLE AND DURABLE CAST COMPONENTS

(75) Inventors: Qigui Wang, Rochester Hills, MI (US); Peggy E. Jones, Saginaw, MI (US); Yucong Wang, West Bloomfield, MI (US); Dale A. Gerard, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 461 days.

(21) Appl. No.: 13/171,502

(22) Filed: Jun. 29, 2011

(65) Prior Publication Data

US 2012/0232685 A1 Sep. 13, 2012

Related U.S. Application Data

(60) Provisional application No. 61/450,912, filed on Mar. 9, 2011.

(51) Int. Cl.
*G06F 19/00* (2011.01)

(52) U.S. Cl.
USPC ......... 700/146; 703/1; 703/2; 703/6; 164/4.1; 164/451

(58) Field of Classification Search
USPC ................. 700/146; 703/1, 2, 6; 164/4.1, 451
See application file for complete search history.

(56) References Cited

U.S. PATENT DOCUMENTS

| | | | |
|---|---|---|---|
| 5,377,119 A * | 12/1994 | Backer et al. ................. | 700/146 |
| 6,544,357 B1 * | 4/2003 | Hehmann et al. ............. | 148/420 |
| 6,763,876 B1 * | 7/2004 | Donahue et al. ................ | 164/34 |
| 6,908,516 B2 * | 6/2005 | Hehmann et al. ............. | 148/406 |
| 6,912,913 B2 * | 7/2005 | Murakami ....................... | 73/808 |
| 7,016,825 B1 * | 3/2006 | Tryon, III ......................... | 703/6 |
| 7,623,973 B1 * | 11/2009 | Wang et al. ..................... | 702/34 |
| 7,761,263 B2 | 7/2010 | Wang et al. | |
| 8,155,940 B2 * | 4/2012 | Wang et al. ........................ | 703/6 |
| 8,355,894 B2 * | 1/2013 | Wang et al. ........................ | 703/1 |
| 2003/0183306 A1 * | 10/2003 | Hehmann et al. ............. | 148/404 |
| 2006/0282186 A1 * | 12/2006 | Hansen et al. .................. | 700/97 |
| 2010/0030537 A1 | 2/2010 | Wang et al. | |
| 2010/0235110 A1 | 9/2010 | Wang et al. | |
| 2011/0144788 A1 * | 6/2011 | Wang et al. .................... | 700/104 |
| 2012/0232685 A1 * | 9/2012 | Wang et al. ..................... | 700/98 |

OTHER PUBLICATIONS

"Modeling of Microporosity, Macroporosity, and Pipe-Shrinkage Formation during the Solidification of Alloys Using a Mushy-Zone Refinement Method: Applications to Aluminum Alloys", by Pequet et al, Metallurgical and Materials Transactions, Jul. 2002.*

(Continued)

*Primary Examiner* — Michael D Masinick
(74) *Attorney, Agent, or Firm* — Dinsmore & Shohl LLP

(57) ABSTRACT

A method and system for optimizing a simulated casting of a light weight alloy component. The simulation includes passing component design data through various computational modules relating to casting designs, process modeling and optimization, material microstructure and defects and product performance. Variations in microstructure and defects across various very small size scales are extended to increasingly larger scales to permit structural performance calculations of the cast component to take such non-uniformities into consideration. At least some of the modules employ an expert system-based approach to achieve the optimized results. The results can be compared to end user needs to determine if redesign of the part geometry or manufacturing process is needed.

35 Claims, 11 Drawing Sheets

(56) References Cited

OTHER PUBLICATIONS

"Modeling microporosity in aluminim-silicon alloys: a review", Lee et al, Imperial College Journal of Light Metals (2001).*

"Microporosity Simulation in Aluminim Castings Using an Integrated Pore Growth and INterdendritic Flow Model", Backer et al, The Minerals, Metals, and Materials Society and ASM INternational 2007.*

* cited by examiner

SYSTEMS AND METHODS FOR COMPUTATIONALLY DEVELOPING MANUFACTURABLE AND DURABLE CAST COMPONENTS

CROSS-REFERENCE TO RELATED APPLICATIONS

This application claims the benefit of U.S. Provisional Application Ser. No. 61/450,912, filed Mar. 9, 2011.

BACKGROUND OF THE INVENTION

The present invention relates generally to methods, systems and technologies that computationally integrate process and product design to help produce reliable and high quality cast components, and more particularly to working across various size scales as a way to accurately model a cast component in way that is both physically accurate and computationally efficient.

Many critical structural applications utilize cast components or products. This is especially true for automotive and related transportation systems, where engines, transmissions, suspension systems, load-bearing primary structures, seating components, interior support structures or the like have all benefited from the low-cost manufacturing associated with casting. Casting processes are often the most cost effective method to produce geometrically complex components and offer net shape or near net-shape capability in comparison with other manufacturing processes. Such casting processes are especially beneficial when used in conjunction with lightweight structural materials, such as aluminum-based, magnesium-based or related alloys, where high strength to weight ratios, good corrosion resistance, and relatively low raw material cost are useful features.

The relatively recent use of computers and their ability to provide automated control has led to even more efficient casting and related manufacturing processes. Similar advancements in computer-based tools have enabled improvements in component design. Individually, such computer-implemented means are known as computer aided manufacturing (CAM) for processing and computer aided design (CAD) for components, while collectively they are known as part of the broad use of computer software known as computer aided engineering (CAE) that also may include computer-aided analysis (CAA), computer-integrated manufacturing (CIM), computer-aided manufacturing (CAM), material requirements planning (MRP), computer-aided planning (CAP) or the like. Generally CAE takes the design from basic principles from CAD and applies more detailed engineering principles to the intended operating environment. Traditionally, component design and process modeling activities have been conducted relatively independently of one another, with the process modeling work largely taking place only after the component design process is substantially complete. Such independence frequently results in long casting development cycles, as well as less than optimum casting quality, reliability or other indicia of component integrity. Additional complexity arises when other considerations, such as the effect of casting defects and related small scale properties, as well as their impact on product performance, are included in the product and process development cycle.

An even more recent discipline, known as Integrated Computational Materials Engineering (ICME), focuses on employing computer-based tools to improve the development of cast components by linking processes and structures to their corresponding properties to computationally simulate component performance prior to undertaking any actual fabrication-related activities. Despite the advantages associated with ICME, initial simplifying assumptions must still be made with regard to casting design, process modeling and optimization, as well as prediction of defects, microstructure and product performance. Many of these assumptions (for example, uniformity in crystal structure, phase properties, precipitates or the like) are based on inherent component designer or manufacturing engineer experience, trial-and-error iterations and other ad hoc approaches, where the emphasis is instead on prototype and foundry trial troubleshooting that takes place only once certain input parameters (for example, alloys, casting processes, casting and gating system features or the like) have been selected or designed.

Neglecting the effect of variations occurring at the smaller scales of lightweight metal alloy castings manifests itself in inaccuracies in the determination of larger scale constituent properties. Likewise, an attempt that only deals with small scale size variations would not be appropriate for modeling larger structures (such as that associated with an entire engine block in automotive applications), as the scales appropriate for smaller scale (i.e., micrometer or nanometer) area investigation would be a prohibitively unwieldy undertaking if applied to the entire component or related larger scale investigation.

Similarly, disregarding or not properly characterizing the effects of conditions such as microporosity, defect formation or residual stress on fatigue life (especially over multiple scale sizes) would make it hard to accurately characterize component performance. For example, microporosity (which tends to be the most common casting defect) can be a significant problem in casting design where simplified methods are used that estimate the biggest so-called micropore based on the local solidification time. Solidification of the metal often takes place in the form of dendrites (which resemble small pine trees in three-dimensional space). The spacing between the dendrites is a function of the local solidification time, and the largest micropore size can be estimated as roughly proportional to dendrite spacing, often by a factor of two or three. Such an empirical approach may provide reasonable estimates on average, but because microporosity is often interconnected over several dendrites or even dendritic grains, this method does not give very good estimates of part performance. While it is possible to make a statistical estimate of the largest micropore (for example, a Maximum Likelihood Estimate or the like) from the empirically based estimates of the average pore size, such approaches are not as accurate as they could be. Even with systems that make a reasonable estimate of factors such as these, it would be beneficial to analyze a broader scale of defects in order to establish a more physically correct model of the defect formation processes that occur during casting, as well as how these defects and the metal surrounding them respond to the service conditions. While various types of microporosity modeling techniques (such as criterion functions, interdendritic flow models, pore growth models and cellular automata (CA)) have been employed to partially explain aspects of the casting phenomena, none have proven adequate for fully modeling a cast component in all its complexity.

For example, criterion functions are empirical rules that use local solidification conditions (cooling rate, solidification velocity, thermal gradients or the like) to predict microporosity formation. While these models are easy to use, they are not applicable under a full range of operating conditions (pressures and geometry) and are therefore limited in scope, especially as they relate to model prediction accuracy. Interdendritic flow models, which comprise the current state-of-theart in commercial finite element/finite difference process modeling software, model the liquid flow feeding solidification shrinkage as a flow-through porous medium (colloquially referred to as the mushy zone). The partitioning of hydrogen gas between liquid and solid phases is modeled, while the formation of hydrogen pores between dendrites is also predicted. In interdendritic flow models, pores are usually assumed spherical with a variable size proportional to some microstructural feature, such as the Secondary Dendrite Arm Spacing (SDAS). However, experimentally-recorded pore growth kinetics disagree with those predicted by interdendritic flow models because pore growth is controlled by the rate at which hydrogen can diffuse to the pores, a key factor which is not included in the interdendritic flow models. Thus, while more generally applicable than the criterion functions, interdendritic flow models have a difficult time accurately predicting pore size. Pore growth models were created to address the principal weakness of interdendritic flow models by more accurately predicting pore size during solidification. In the state-of-the-art pore growth model, the thermal model for pore growth during solidification does not calculate pressure; thus, the porosity (diameter and volume fraction) is consistently underpredicted because the effects of the volumetric changes when metal solidifies on the pressure are not considered. The CA technique for microstructure and pore size prediction, while receiving some attention in academia, has yet to be used in an industrial/commercial setting. In such an approach, the formation of individual grains and dendrites is stochastically modeled with growth rates either analytically prescribed or predicted from solute concentration balances. Pore growth can also be modeled within the CA method via a diffusion equation for hydrogen. While the results from CA have been promising, they require an extremely refined mesh size. Where interdendritic flow models can use mesh dimensions of 1 to 10 mm, CA requires mesh dimensions of 1 to 70 µm—three orders of magnitude smaller. As a result, CA is generally applied to casting submodels, using thermal histories predicted from a macromodel on a coarser mesh.

As such, previous attempts to model aluminum casting across multiple scales have not taken full advantage of an integrated approach, especially as they relate to microporosity (without having to make simplifying assumptions), casting geometry and gating/riser design optimization, treatment of larger defects (such as oxide films, core gas, entrained gas, eutectic phases (including their impact on fatigue calculations)), as well as how to estimate fatigue properties when there are no casting defects present in a particular location.

SUMMARY OF THE INVENTION

In view of the above and other problems, it is an object of the disclosure to provide methods, systems and technologies to help design and produce high quality and structurally-reliable cast components that take into consideration various disciplines relating to casting designs, process modeling and optimization, material microstructure and defects and product performance in such a way that error-producing simplifications and assumptions are eschewed in favor of knowledge-based methods.

According to one aspect of the present invention, a method of computationally simulating a casting process for a lightweight metal-based (for example, an aluminum alloy-based) component includes operating a computer with numerous computation modules such that upon receipt of data pertaining to the component, the computer subjects the data to the various computation modules. Output data or related information provides indicia of how well the contemplated casting process can be expected to work, thereby giving a component designer or process engineer a measure of confidence that the proposed design and process can be reliably and efficiently manufactured. This output data may include quantifiable metrics in the form of performance indicia related to actual component operating environments such that the output data can be analyzed to determine if it coincides with an optimal product and manufacturing process design. In the present context, performance indicia is that which corresponds to a simulated casting process that is deemed to satisfy the design and manufacturing criteria of the component being modeled through the various modules of the virtual casting system disclosed herein. As will become apparent from the present disclosure, the performance indicia generated by each of the various modules may or may not constitute an optimal process, depending on whether or not such performance indicia satisfies a user-defined state of properties for the actual component, or other such independent criteria.

The computer includes the features needed to perform the present method; such features include a data input, a data output, a processing unit, a memory unit and a communication path configured to establish cooperation between these components to enable the computer to function in a manner known to those skilled in the art. In one form, the communication path may be a data bus or related set of wires and associated circuitry that can interconnect the input, output, CPU and memory, as well as any peripheral equipment arranged in such a way as to permit the system to operate as an integrated whole. As such, the communication path can be formed as part of (or be cooperative with) a controller used to coordinate computer activities. Likewise, the controller may be formed as a part of the processing unit, or may be a separate component; either variant is well-understood by those skilled in the art. The memory unit includes at least one of data-containing memory and instruction-containing memory.

The various computation modules include a casting design module, a process modeling and optimization module, a multiscale defects and microstructure prediction module and a structure performance module; these modules cooperate with one another to convert the subject matter representative of a proposed cast component into a different finished product. The casting design module provides a geometric representation of an optimal casting component based on input data of initial product geometry and property requirements of the component being analyzed. Within the casting design module, the final geometry of the part acts as a starting point for the casting design. Representations of material additions at selected locations are included to achieve improved dimensional tolerances, Likewise, considerations of casting flow-path (also referred to herein as rigging) design and attachment schemes are provided for to allow delivery of the liquid metal to make the part. Such rigging includes pour cups, sprues, runners and risers; these all play important roles in the quality and economic viability of a cast product. The process modeling and optimization module determines one or more of a casting process, heat treating and machining of the final casting design that comes out of the casting design module. Both the casting design module and the process modeling and optimization module may use a knowledge base in conjunction with a geometry analyzer and inference engine such that optimum values associated with the respective model are iteratively produced through an expert system. The computer can be configured to form part of the expert system, one of the benefits of which is that no additional experience base, intuition or learned design practice need be input into the system once the data peculiar to a particular casting project has been defined, as a premise set (based on casting design specifications and their corresponding indices) will be modified by the inference engine without recourse to subjective input or know-how.

The multiscale defects and microstructure prediction module receives as input the final casting design and the optimal manufacturing procedures of the respective casting design module and the process modeling and optimization module, and produces as output predicted microstructural constituent morphology and distributions. These microstructural predictions may include discontinuities, dendrites, multiscale phases, eutectic particles and precipitates. In addition to microporosity, discontinuity predictions from this module may include, but are not limited to, core gases, oxides, bifilms, folds and cold shuts, as well as inclusions, entrained gas, core gas, entrained pre-formed metal skin (i.e., formed in a metal shot sleeve), macroporosity and microporosity. These discontinuity predictions may be applicable to each of the disclosed aspects. Examples of how these features can be modeled are found in co-pending application Ser. No. 12/653,606 which is owned by the Assignee of the present invention and hereby incorporated by reference in its entirety. Optionally, a test casting with well-controlled solidification conditions can be used to calibrate the module to ensure accuracy across numerous scales, where the smallest of these characterize crystal structure, phase properties and precipitates. Such values can be used to determine and extrapolate very small scale local properties in order to analyze pore size, grain/dendrite morphology and eutectic particle structure, as well as casting defects, grains and dendrite arm spacing (DAS) for an entire cast component at the large scale. Unwieldy computational time is kept to a tractable level by matching up the thermal history at any given location in the proposed component casting to the thermal history of a test casting, then accounting for composition differences between the proposed component casting and the test casting by using thermodynamic models to predict phases, and finally mapping the expected microstructure to the new part without re-running all the nanoscale calculations.

Once an entire component is analyzed for its defects, grain structure and multiscale phases, the component's structural attributes, including tensile failure, creep resistance and multiscale fatigue life, can be assessed to predict the component's performance. The structure performance module subjects the predicted multiscale microstructures and defects to function or durability test simulation, accounting for the predicted residual stress and distortion, to produce a performance prediction that may include failure probability mapping and failure mode and location prediction. Predictions of individual component performance can be extrapolated to predict reliability of many such components, thereby improving (for example) warranty predictions for a given application. Additional information on fatigue life prediction may be found in U.S. Pat. No. 7,623,973, as well as in co-pending application Ser. Nos. 12/182,314 and 12/402,538, all of which are owned by the Assignee of the present invention and hereby incorporated by reference in their entirety. The inclusion of multiple parameters such as tensile ultimate strength, ductility, creep and fatigue crack initiation and growth from the physically correct variety of potential crack initiation sites and crack paths within the microstructure offers significant increases in accuracy relative to computations that only take yield strength, thermal growth and fatigue crack growth from microporosity into consideration. Likewise, the performance prediction output of the structure performance module includes failure probability mapping and failure mode and location prediction. In the present context, various failure modes are possible. For example, in tensile failure, the part can break suddenly, while in creep, the part may slowly change shape over time, whereas in a fatigue failure, cracks will grow over time until the crack becomes large enough such that the part can no longer bear the load for which it was designed. The mode indicates which process will cause loss of function first at a given location. Such mode knowledge is helpful in analyzing failure in ways not previously considered in that by accounting for larger scale defects (such as core gas and cold shuts), methods performed in accordance with the present invention may provide indicia of tensile failures that would not have been predicted by methods that only consider the presence of smaller defects that cause small cracks to develop over time. Similarly, it is important to know the probability of a particular failure mode occurring, as some failure modes, while harmful, may occur with a rarity that makes it generally unnecessary to try to prevent them. Decisions as to whether to investigate such failure modes may be further based on additional criteria, such as whether eliminating a rare failure mode might accelerate a competing and more common failure mode. With the consideration of local discontinuity and microstructure variation, the material's properties and failure probability for a variety of failure modes can be calculated and/or mapped from node to node across the entire casting component.

In one form, the lightweight alloy (such as aluminum-based or magnesium-based alloy) component being modeled includes automotive components. More particularly, such automotive components may include engine blocks, cylinder heads, transmission cases, oil pans, shock towers, suspension parts, control arms, engine cradles, vehicle front ends, door frames, wheels, seating parts, instrument panels, and interior structures. In such case, the casting design module further comprises optimizing a geometric representation of at least a particular portion of the block or head, such as the gating/riser system. In another option, by comparing the performance indicia against predetermined criteria (such as in a decision tree or related logic test), the method may or may not iterate the process; in the case where the predetermined criteria is satisfied, the simulated casting process is determined to be an optimized process, whereas in the case where the predetermined criteria is not satisfied, a product geometry redesign is submitted to the computation modules for generation of updated performance indicia. This process can be repeated as often as necessary until such time as the optimized process is attained.

In yet another option, the multiscale microstructure prediction module provides quantitative indicia of one or more of dendrite arm spacing, volume fraction and sizes of second phases of the microstructural architecture. More particularly, the microstructural architecture includes one or more of primary dendrites, eutectic particles and eutectic matrix. Furthermore, the multiscale microstructure prediction module may be operated to simulate the formation of precipitates and analyzes the volume fraction and size distribution of nanoscale precipitates in at least one of primary dendrites and a eutectic matrix.

The various size scales may be made to coincide with that of the component being modeled. For example, a large scale may (in automotive applications) extend from between about ten millimeters to about one meter, while an intermediate scale extends from between about one micrometer to about ten millimeters and a small scale extends from between about one tenth of a nanometer to about one micrometer. A database of property values generated at the smallest of the scales is preferably based on non-uniform properties that have been extrapolated to at least one of the larger scales such that relationships generated between multiscale microstructure characteristics and local non-uniform properties and solidification conditions may be used without running a small scale simulation for a substantial entirety of the component. More preferably, the microstructure characteristics of the various size scales are used by the structure performance module to predict local mechanical properties.

In another option, the structure performance module analyzes the component as a composite of eutectic reinforcement particles, eutectic matrix materials and dendrite matrix material. In this way, the structural response of the composite is based on an integration of structural property predicted values of these individual microstructural constituents. More particularly, the structure performance module analyzes the strengths of dendritic matrix material and eutectic matrix material based on predicted nanoscale precipitates that are a portion of the microstructural architecture over numerous size scales, as well as the strengths of the eutectic particles and the interfaces between the eutectic particles and matrix. These interfaces are valuable in that tensile failure modes include breaking the reinforcement particles or separating them from the eutectic matrix if the interface strength is too low. The fatigue failure modes also depend on the strength of the interfaces compared to the strength of the constituents.

In another option, the material characteristics, defect population estimates and microstructural architecture output form a multiscale microstructure prediction of one or more of predicted microstructural constituents and multiscale defects. In still another option, the structure performance module may be used to determine creep resistance. Similarly, a multiscale defect and microstructure dependent creep resistance analysis may be conducted through one or more of the casting design module, the process modeling and optimization module and the multiscale microstructure prediction module. Likewise, a multiscale defect and microstructure dependent fatigue analysis may be conducted through one or more of the casting design module, the process modeling and optimization module and the multiscale microstructure prediction module. Relatedly, a multiscale defect and microstructure dependent tensile failure assessment may be conducted through one or more of the casting design module, the process modeling and optimization module and the multiscale microstructure prediction module. Furthermore, the structure performance module may be used to conduct a reliability analysis. Although the terms "assessment" and "analysis" are generally synonymous, the nomenclature "tensile failure analysis" has not been used herein in an attempt to avoid confusion with the engineering term of art "failure analysis". Instead, the process of comparing the component's strength to an applied tensile load is referred to herein as a "tensile failure assessment" rather than a "tensile failure analysis".

In yet another option, the output from the multiscale microstructure prediction module may include a quantitative prediction of macro and micro defect results. Such results may include, but not limited to, oxide films, entrained gas, cold shuts, misruns, core gas, inclusions, macroporosity and microporosity throughout a substantial entirety of the cast component. More particularly, the macro and micro defects include oxide bifilms that form when oxide films from adjacent streams meet at large angles. In other examples, the macro and micro defects are made up of flow marks or cold shuts. In yet another option, the casting process being simulated is a sand casting process; in this way, the macro and micro defects further include core gas bubbles formed by water vapor, carbon dioxide and pyrolysis products released from heated chemical binders in the sand casting process. In another form, the macro and micro defects include entrained gas bubbles. In general, entrained gas bubbles and core gas bubbles are different. Entrained gas is that which is mechanically mixed into the metal, and includes two common mechanisms the first of which is where gas, usually air, is aspirated into the mold via the "downsprue", and the second of which occurs when the metal turbulently fills a mold cavity faster than the air or other gases inside can escape (die castings). The other gases inside the mold/die may result from die coating or die lubricant. Core gas bubbles only form after the hot metal has been in contact with a substance that will generate gas when heated. The core gas defects form at a different time in the casting process, and have a different chemical nature than the entrained gas. In another form, the macro and micro defects include inclusions. Inclusions may be any foreign materials already in the liquid metal prior to mold filling, or something like mold material, die coating, or die lubricant being washed into the liquid metal during mold filling, or metal skin that forms in a metal shot sleeve if casting process is not managed properly and is then pushed into the gate and subsequently the casting. In another form, the microporosity is predicted by integrating an interdendritic flow model and a pore growth model. The pore growth due to hydrogen diffusion from liquid metal is calculated using boundary conditions represented by a first hydrogen concentration in the liquid metal at a pore interface that is in equilibrium with a hydrogen gas pressure in a pore, and a zero flux of hydrogen at an outer radius.

According to another aspect of the present invention, a method of computationally simulating a casting process for an aluminum-based component is disclosed. The method includes configuring a computer in a manner generally similar to that above and inputting into the computer geometric and property requirements corresponding to the component. Once the component-specific features are input, various computation modules can be operated to produce a performance prediction or related indicia. Optionally, the performance prediction output of the structure performance module includes failure probability mapping and failure mode and location prediction. In another optional form, one or more of the casting design module and process modeling and optimization module may employ an expert system (such as discussed above) as part of their operation.

According to another aspect of the present invention, an article of manufacture is disclosed. The article includes a computer usable medium having computer readable program code embodied therein for simulating a casting process for an aluminum-based component. The computer readable program code includes portions for causing the computer to accept data pertaining to the aluminum-based component, perform an iterative casting design analysis based on the accepted data, perform a process optimization analysis based on an output produced by the casting design analysis, perform a microstructure analysis based on an output produced by the process modeling and optimization analysis and to perform a structure performance analysis based on an output produced by the microstructure analysis such that an output produced by the structure performance analysis defines a performance indicia of the simulated casting and its manufacturing process.

In a related aspect of the present invention, a system for analytically determining how to cast an aluminum-based component is disclosed. The system includes data input, data output, processing, memory, control and communication equipment cooperative with one another and a set of computation modules as a way to determine an optimum design and manufacturing approach for the component. As will be appreciated by those skilled in the art, a data processing device that includes the aforementioned input, output, processing or related arithmetic logic unit, control and memory linked together forms the basis of a von Neumann or related computer architecture. The computational modules are programmably configured to receive parameters associated with an aluminum-based component to be cast, and include a casting design module, a process modeling and optimization module, a multiscale module (for determination of casting defects and microstructure predictions) and a structure performance module. The operation of these four modules is integrated into a system, a portion of which employs an expert system-based approach to integrating component design and manufacturing. One component of such integration is the system's ability to reconcile the macroscale (i.e., millimeter or larger) tools of the casting design, process modeling and optimization, and structural performance evaluations to the varying (i.e., macro, micro, and nano) scales of the multiscale tool.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

Figure 1A:
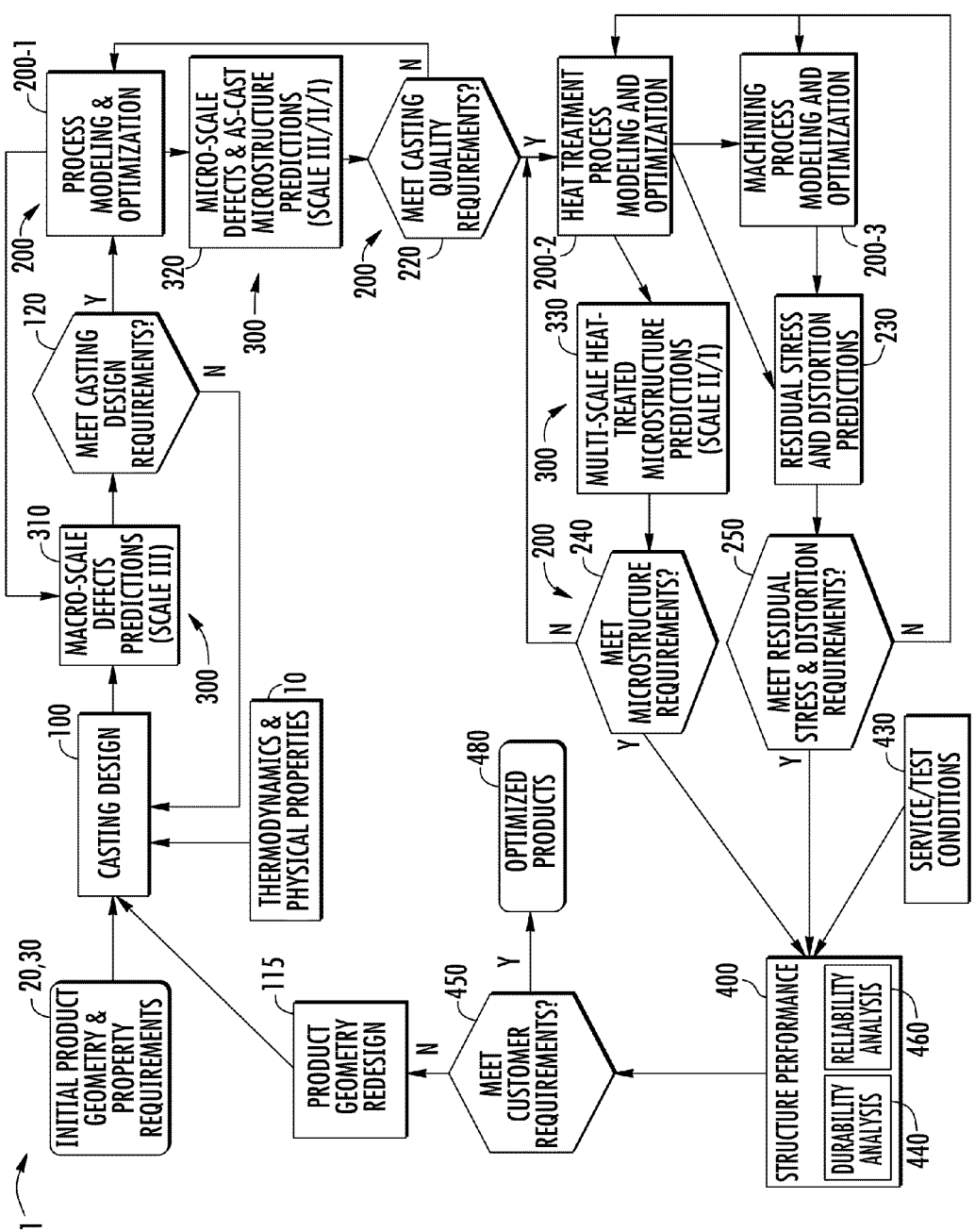
FIG. 1A shows the basic steps associated with the modules that make up the VCCD system of the present invention where a proposed casting is subjected to heat treatment after solidification.

Referring first to FIG. 1A, the four main computational modules of a VCCD system (also referred to herein as VCCD expert system, virtual casting system, or more simply, a system) 1 are a casting design module 100, a process modeling and optimization module 200, a multiscale defects and microstructure prediction module 300 and a structure performance module 400, all as shown along particular locations of the VCCD system 1 flowpath. The disclosed VCCD system 1 is a particular implementation of CAE and ICME that allows virtual components to be subjected to iterations in design, casting, heat treating and structural and durability assessment in order to optimize the subsequent manufacture of actual equivalents of such components. Particular consideration is given in the VCCD system 1 to casting geometry and gating/riser design optimization, an accurate microporosity determination (rather than mere simplifying assumptions), treatment of larger defects such as mentioned above that are common in aluminum castings, and the effect on the fatigue and related reliability calculations of how the eutectic phases are arranged within the microstructure. The approach of the present invention is particularly well-suited to estimating fatigue properties when there are no casting defects present in a particular location; this approach is generally dissimilar to that of a short crack or long crack fatigue models that require an assumed defect to be present.

As shown in the flowpath, output from one or more of the modules 100, 200, 300 and 400 can be used as input into one or more of the remaining modules 100, 200, 300 and 400. In addition, certain decision points, including whether the proposed design meets casting design requirements 120 (also called final casting design), casting quality requirements 220, microstructure requirements 240, residual stress requirements 250 or customer requirements 450 are used in an attempt to determine if the approach of the VCCD system 1 produces an optimized product 480. The casting design module 100 may be used to perform numerous design of experiments (DOE) or related iterative tasks on the product geometry requirement input 20 and property requirement input 30 in order to provide an optimal casting geometry model with gating/riser system designs and alloy/process recommendations as output in the form of casting recommendations in casting design requirements 120.

Figure 1B:
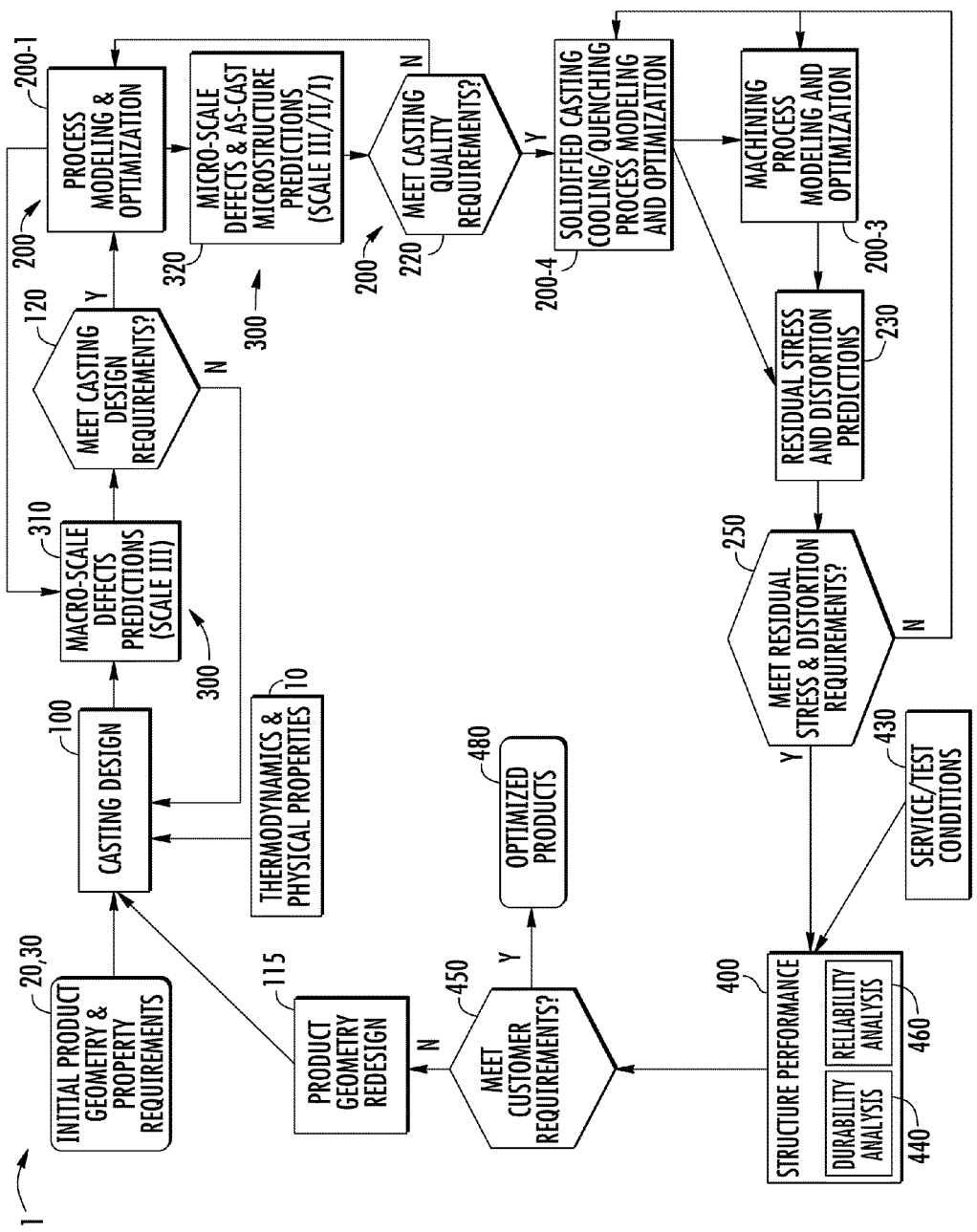
FIG. 1B shows the basic steps associated with the modules that make up the VCCD system of the present invention where a proposed casting is not subjected to heat treatment after solidification.
Figure 2:
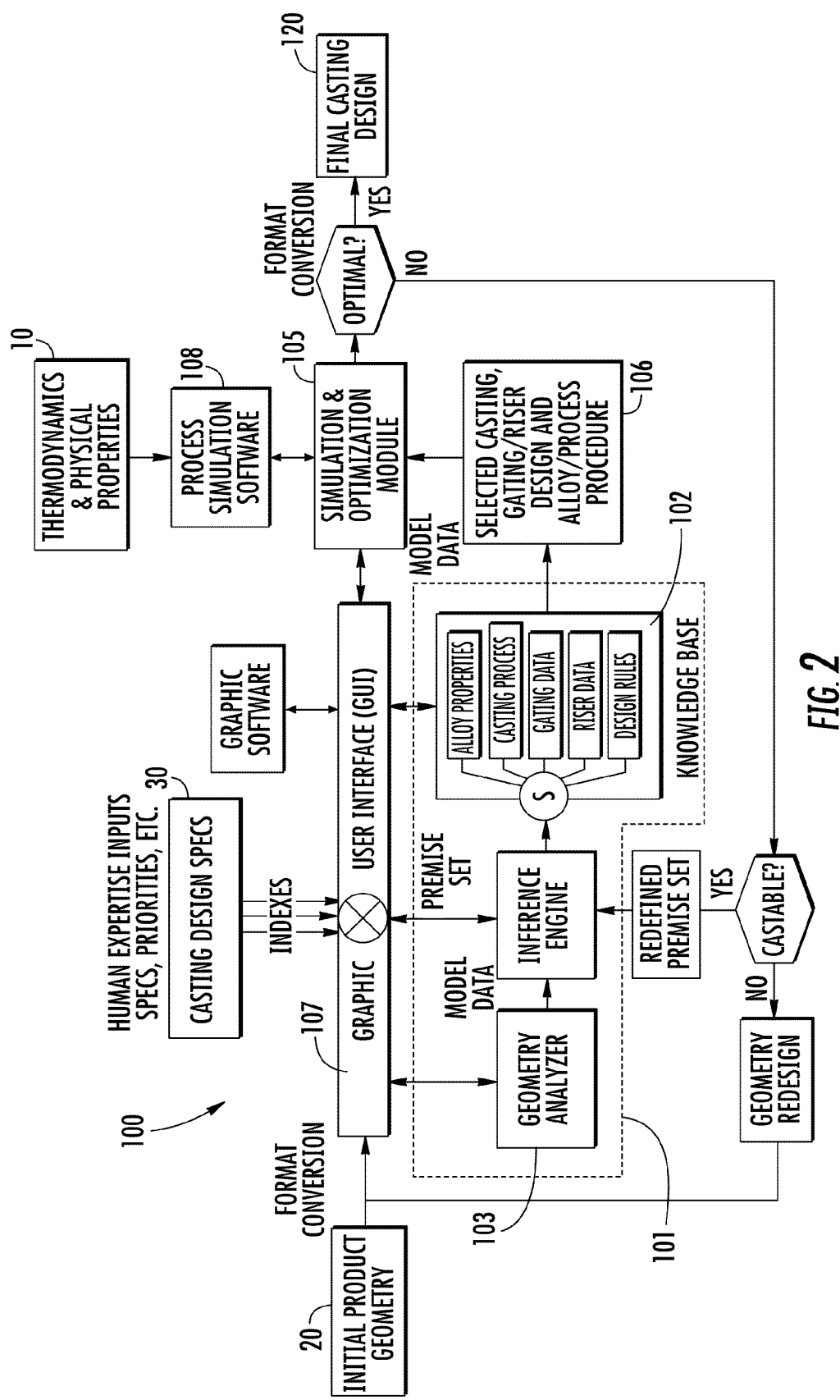
FIG. 2 is a schematic illustration depicting the use of an expert system for the casting design module.

Referring next to FIG. 2 in conjunction with FIGS. 1A and 1B, tasks performed within the casting design module 100 include, but are not limited to, an initial estimate of alloy properties, casting process selection (for example, die casting, sand casting or related methods), gating and riser data and related design rules. Collectively, these activities are performed using a knowledge base 102. An exemplary cast component, for instance an automotive cylinder head, may include as typical casting processes green sand casting, precision sand casting, semi-permanent mold casting and evaporative pattern (lost foam) casting. Certain casting processes, such as high pressure die casting, may be deemed to be inappropriate for various reasons particular to the component in question, such as the geometric complexity of the part. In any event, once the casting process selection and alloy properties selection are made, the related casting design rules in the knowledge base 102 will be used for initial gating/riser design, chill location, size design and related parameters. After an initial shape is defined, the optimal dimensions may be obtained through DOE numerically, where the casting defect results will be estimated for each run within the DOE matrix and used in final optimization. One advantage of using DOE is computational speed, allowing an optimized casting design to be determined in only a few iterations. Another advantage is that the relative contributions of the various factors are listed in the DOE output, making it clear which variable or variables have the most impact on the casting defects. Furthermore, because actual casting processes involve the interaction of the input parameters and output, the use of DOE methods facilitates examination of interactions between input variables on the results without recourse to the time and expense associated with physical trial and error methods. Output from module 100 in the form of final casting design 120 provides a rough approximation of the casting process, alloy composition, casting geometry, and rigging (i.e., gating, machining stock, and risers) based on the product geometry and property requirements 20.

Figure 3:
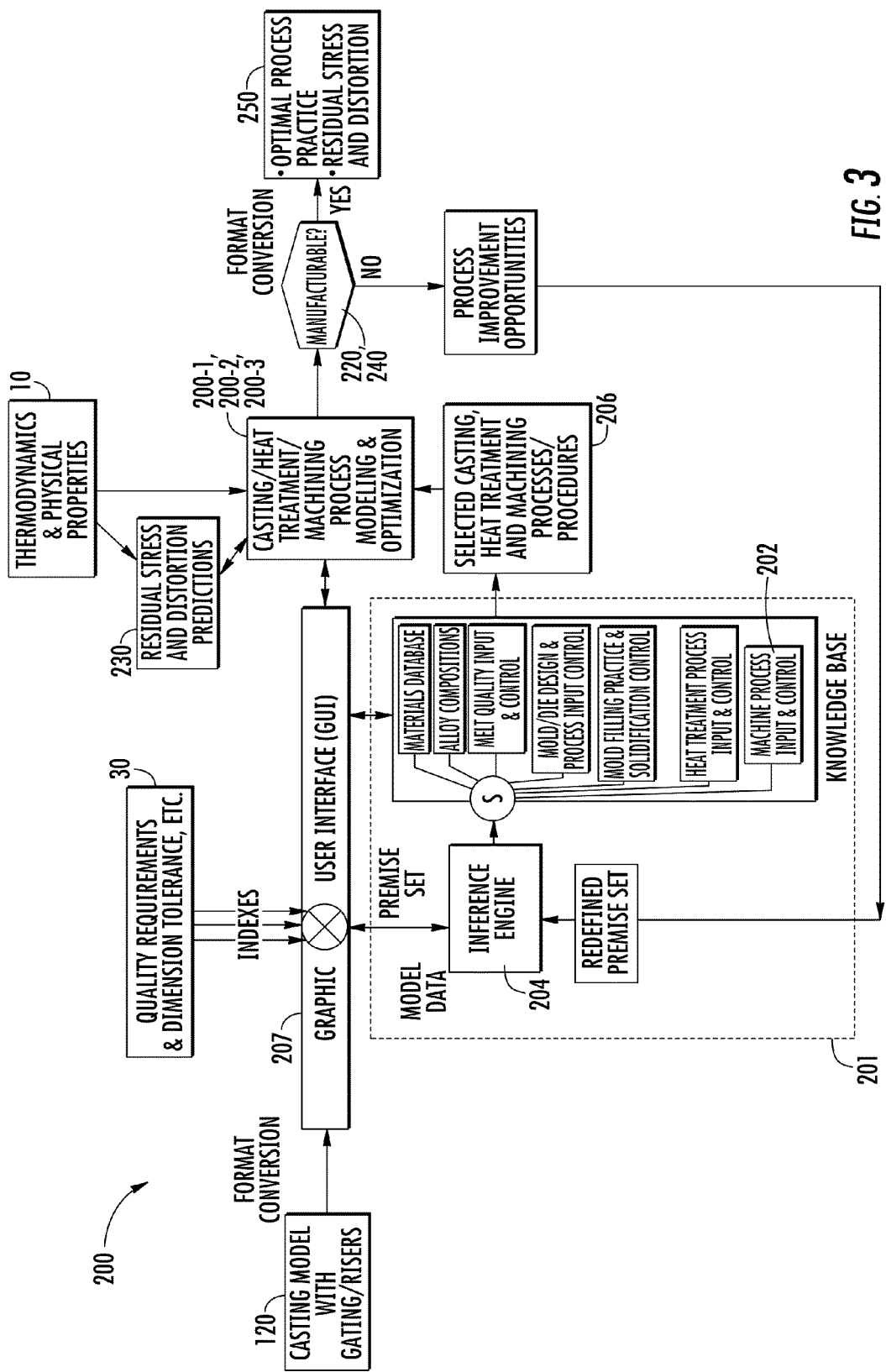
FIG. 3 is a schematic illustration depicting the use of an expert system for the process modeling and optimization module.

This information can be passed on to the process modeling and optimization module 200 that is used to interact with the microstructure and defect calculations of module 300 through heat treatment simulations in submodule 200-2 to produce as output quality indicia, examples of which include the submodule optimal process practice, residual stress and distortion, and process improvement opportunities (both as shown in FIG. 3) As shown in FIG. 3, output 250, the optimal process practice recommendations can be used to accelerate process engineering's preparations for a new product. Equipment capability requirements can be quantified, such as the hydrogen level required in the degassing station on the cast line, and process control documentation can be prepared with limits based on the model output well in advance of the production trials. For instance, if the target porosity level was less than 0.5 volume percent, the process optimization would report that the predicted porosity levels on the casting model exceeded the target, or sum the number of nodes which exceed this value. Examples in table form show results and recommendations for both a non-optimized casting and process design (Table I) as well as an optimized one (Table II).

TABLE I (non-optimized casting)

| Quality Index | Meets target | Exceeds target | Recommended change |
|---|---|---|---|
| % Porosity <0.5% | Yes, max 0.4% | | |
| No. of bifilms/cm$^3$ <100 | No | Node 10772: 200/cm$^3$ Node 10773: 250/cm$^3$ | Reduce velocity |
| Max pore size <200 μm | No | Node 12222: 700 μm | Reduce Hydrogen content or increase local cooling rate |
| Residual stress <80 MPa | No | Node 15331: 120 MPa | Raise quench media temperature |

TABLE II (optimized casting)

| Quality Index | Meets target | Value |
|---|---|---|
| % Porosity <0.5% | Yes | Max. 0.4%, mean 0.2% |
| No. of bifilms/cm$^3$ <100 | Yes | Max. 99/cm$^3$, mean 90/cm$^3$ |
| Max pore size <200 μm | Yes | Max 150 μm., mean 100 μm |
| Residual stress <80 MPa | Yes | Max. 78 MPa, mean 30 MPa |

In FIGS. 1A and 1B, results such as in the above tables would form input to the decision step entitled casting quality requirements 220 and to the decision step entitled residual stress requirements 250.

Referring with particularity to FIG. 3 in conjunction with FIGS. 1A and 1B, an expert system 201 employing (among other things) a knowledge base 202 can be used as part of process modeling and optimization module 200 to include at least one of a materials database, mold/die design and process input control (to establish thermal boundary conditions for the solidification analysis), melt quality input and control (as input to include consideration for (among others) oxides, bifilms and hydrogen levels), mold filling practice and solidification control, heat treatment process input and control and machining process input and control, all of the above configured as tasks, tools or submodules. The results of the machining process input and control submodule give an indication of shape, strength and residual stress extant in the component that has been modeled by the other submodules within the process modeling and optimization module 200. In one form of output, the mold/die design and process input control submodule and mold filling practice and solidification control submodule can be used in conjunction with display or printer software to produce color pictures or related graphical representation. The output (in the form of process improvement opportunities and recommended optimal process practices) are then subjected to a decision related to casting quality requirements 220 such that the component designer or process engineer may employ his or her best practices, while output from the residual stress and distortion predictions 250 may be used to provide valuable input information for the structure performance module 400.

Residual stresses resulting from heat treatment of castings need to be considered, especially changes in the distribution of such stresses based on machining operations conducted after heat treating. For example, the removal of a riser or related ancillary material after heat treating is a machining step that may significantly impact the distribution of residual stresses that are used in subsequent analyses, such as a durability analysis. The approach used by the various modules of system 1 may take as-heat treated residual stress states through a simulated machining process to more accurately predict the residual stresses in a proposed component. Referring with particularity to FIG. 1B, in certain circumstances, the casting may be naturally aged; in such an event, output from the casting quality requirements 220 would still be input to microstructure requirements 240 and the residual stress and distortion requirements 250 with the proviso that the heat treatment is in fact room temperature aging. As such, the casting is used in an as-cast condition, in effect meaning that the as-cast defects and microstructure predicted in submodule 320 are fed to the performance prediction module 400 without regard to process modeling iterations to account for the heat treating. Even though the casting is not subjected to heat treatment, the as-cast residual stress and distortion still needs to be predicted in submodule 230. Likewise, although the casting is not subjected to the heat treatment considerations of FIG. 1A, consideration of machining effects, shown in submodule 200-3, is still needed. Submodule 200-4, which is unique to the natural-aged approach depicted in FIG. 1B, is used to simulate the cooling process of a solidified casting mainly to provide input to the residual stress and distortion calculations of submodule 230. Furthermore, it is preferable that the heat treatment process modeling (regardless of whether in the form of the room temperature approach of FIG. 1B or the elevated temperature approach of FIG. 1A) will be done using a geometry representative of the component as it enters the heat treatment process.

The optimization functions on modules 100 and 200 provide input to, and respond to output from, the multiscale defects and microstructure prediction module 300. As indicated above, module 300 provides detailed predictions of defect populations and microstructure distributions for the cast component based on the casting design and process inputs. In one essential component, module 300 takes global scale heat transfer and fluid flow conditions from module 200 to predict dendrite and eutectic formation at the microscopic level. One or both of mesoscale and nanoscale codes are used to predict the as-cast microstructure and possible casting defects in terms of the size, volume fraction, and morphology. The predicted defect populations can be used as a quality index to be optimized within module 200.

The input information (thermal, chemical, physical, or mechanical) for the mesoscale or nanoscale as-cast microstructure (dendritic and eutectic structures) and casting defect simulation is provided by a macroscale volume of fluid (VOF) simulation that makes up a portion of process modeling and optimization module 200. Representative casting defects predicted in module 300 include, but are not limited to, macro and/or microporosity, oxides and inclusions, hot tearing, misruns, core gas, cold shuts and entrained gas. The microstructure constituents include, but are not limited to, dendritic grains, dendrite cells and second phase particles in both microscale and nanoscale regimes. To arrive at these, module 300 includes provisions for a material database, boundary conditions, multiscale phase equilibrium, prediction of the above-mentioned casting defects, microscale second phase prediction and nanoscale precipitate prediction tools, tasks or submodules. These small scale properties are highly dependent upon the manufacturing history of the component, making it of significant importance to integrate operations across the various modules. As such, input received from modules 100 and 200 is used to introduce the impact of the casting design and the various manufacturing processes on small scale material properties that are in turn used to predict larger scale mechanical and physical properties of the component being cast. Output from the microstructure requirements decision 240 is in the form of microstructural constituents that can be fed back into heat treatment process modeling and optimization submodule 200-2 and the multiscale heat-treated microstructure predictions submodule 330. The factors determined in module 300 provide the most reliable way to conduct the multiscale fatigue analysis of submodule 400D. The output from the multiscale microstructure prediction module 300 includes materials characteristics, defect population estimates for a broad range of defect types, and microstructural architecture over a plurality of size scales. The materials characteristics output include, but are not limited to, material liquidus, solidus, fraction of solid as a function of temperature, solidification sequence, thermodynamic and thermo-physical properties of individual solidified phases. The defect population output of the various defects is comprised of, but not limited to, oxides, entrained gas, cold shut, core gas, macroporosity and microporosity. The microstructure architecture is a composite of the microstructure constituents. These microstructure constituents are described by microstructure characteristics such as, but not limited to, solidified phases, volume fractions and size distributions of individual phases, composition and crystallographic structure of individual phases, or the like.

Figure 5:
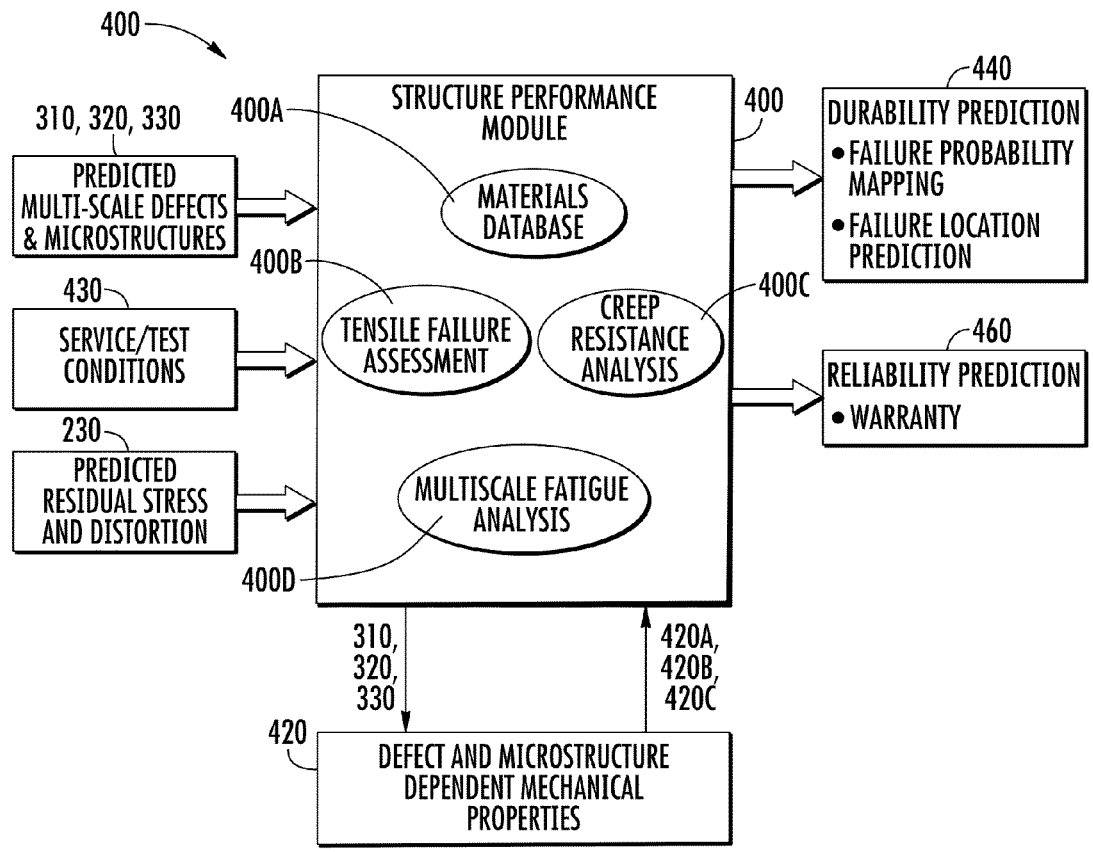
FIG. 5 is a schematic illustration of input to and output from the structure performance module.
Figure 6:
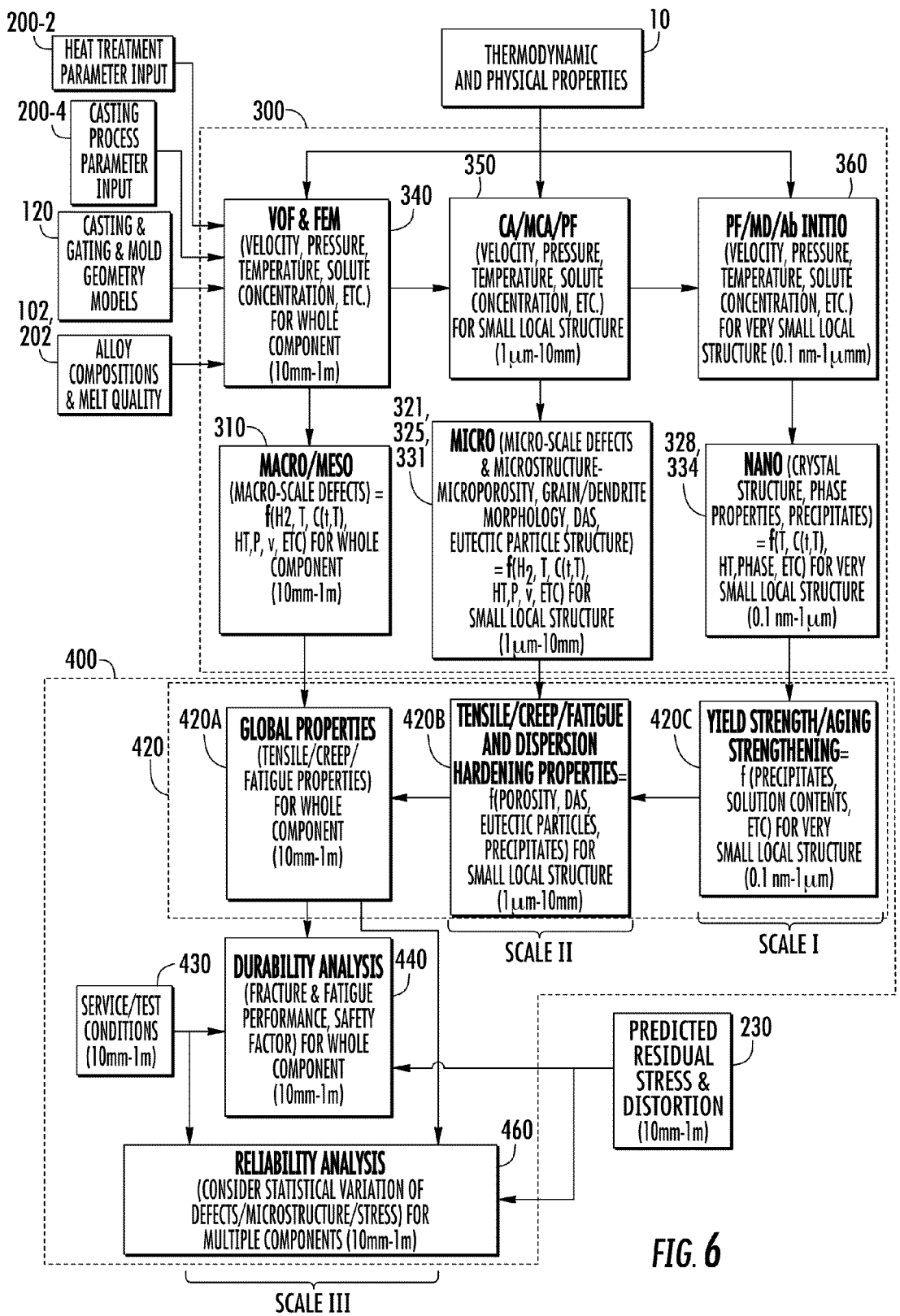
FIG. 6 is a schematic illustration showing the correlation of operations between the various size regimes of two of the modules of the VCCD system.

Referring with particularity to FIGS. 5 and 6 in conjunction with FIGS. 1A and 1B, structure performance module 400 assesses the durability of the component or product that is subjected to a testing or service load; preferably, it is based on probabilistic micromechanics models. The performance prediction serves as output from module 400, and indicates where the component can be expected to fail, by which failure mode, and the probability of failure. At this juncture, if the durability of the component being modeled meets the requirements, the structural attributes will have been verified; if not, then the analysis will return to the casting design module 100 to try again. In one aspect, module 400 includes at least a materials database submodule 400A, tensile failure assessment submodule 400B, creep resistance analysis submodule 400C and multiscale fatigue analysis submodule 400D. Input to the structure performance evaluation module 400 (which also includes mechanical property predictions) is shown in the form of numerous submodules 310, 320 and 330 of the multiscale defects and microstructure prediction module 300, service/test conditions 430 and predicted residual stress and distortion 420A. Of these, service/test conditions 430 provide loading conditions; while residual stress 420A, along with any assembly stresses included in service/test conditions 430, provide the pre-existing stresses in the component; for structural performance or durability simulations. Materials database submodule 400A provides materials thermophysical properties (such as those depicted in thermodynamics and physical properties 10 of FIGS. 1A and 1B) needed by the other submodules. The submodule 400B is to calculate the tensile performance by comparing the local material tensile properties with tensile loading conditions. This acts as a first stage-gate, in that failure of this moots any additional inquiry into the proposed component's merits. The submodule 400C is to calculate the local material creep resistance as covered in submodule 420A from multiscale microstructure and to compare the material properties with local thermal and stress conditions. Similarly, the submodule 400D is to calculate local material fatigue properties (also covered in submodule 420A) and performance. In particular, multiscale fatigue analysis includes a series of inquiries, the first relating to whether a large flaw (such as a bifilm, cold shut or other as discussed herein) is present, the second relating to situations where microporosity is the only significant anomaly present, and the third where there is no discernable defect at the location being evaluated. Questions such as these are important for casting in general, and particularly as they relate to die casting.

Figure 4A:
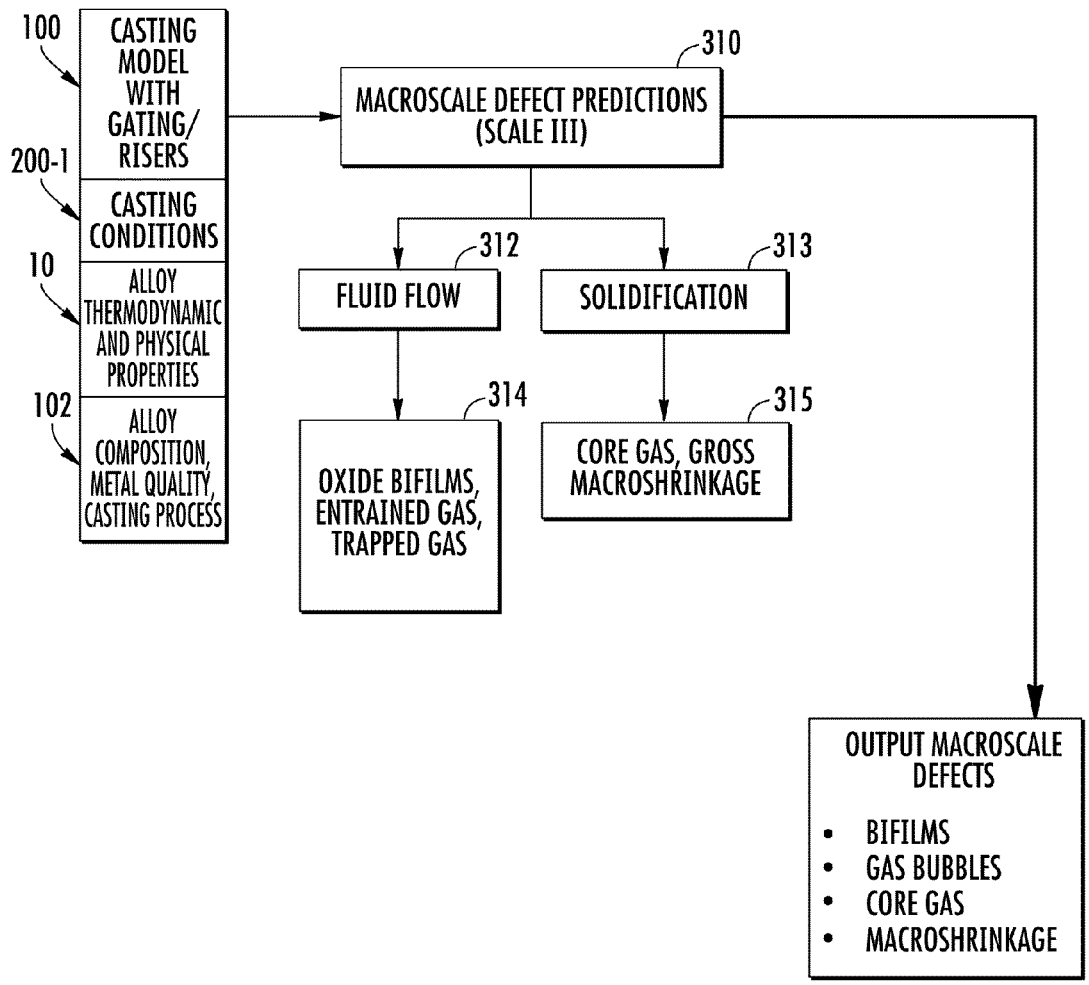
FIGS. 4A through 4C are schematic illustrations of input to and output from the multiscale module that can be used for microstructure and defect predictions.
Figure 4B:
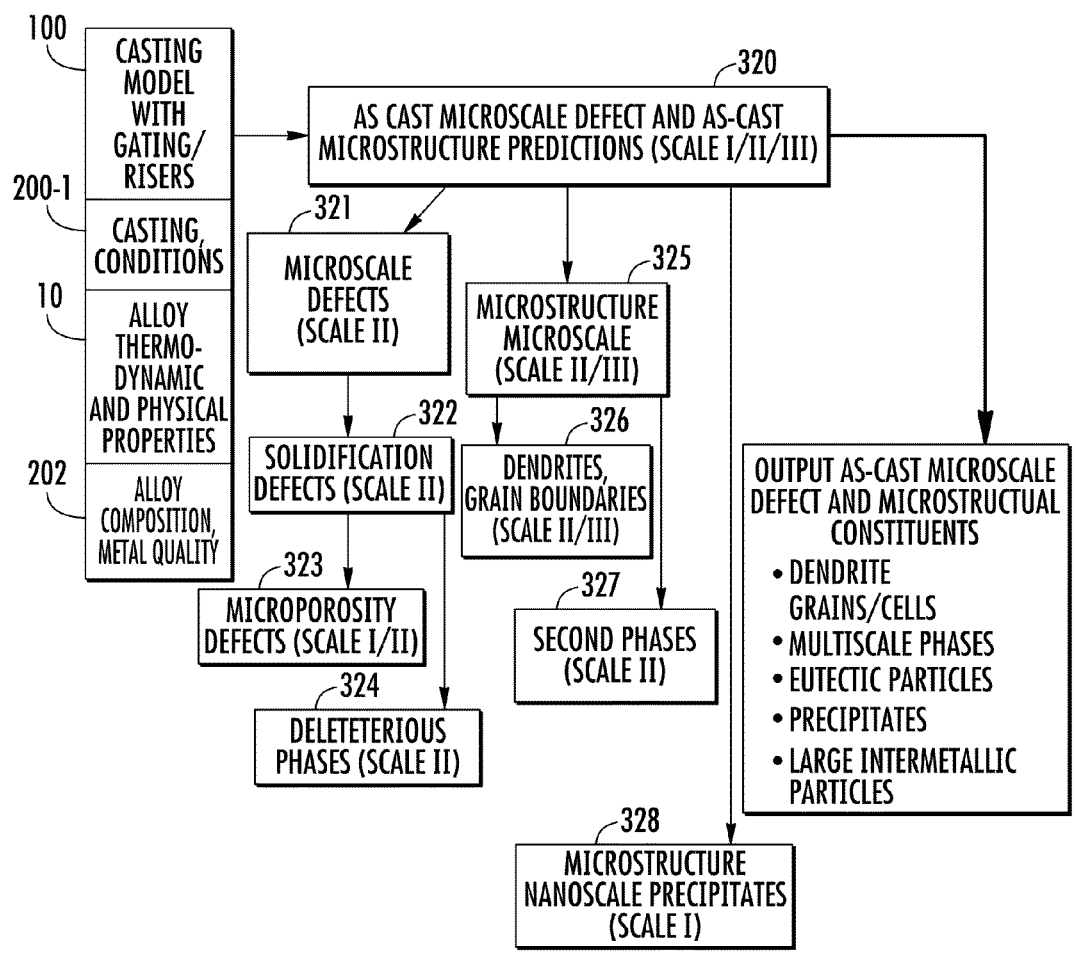
Figure 4C:
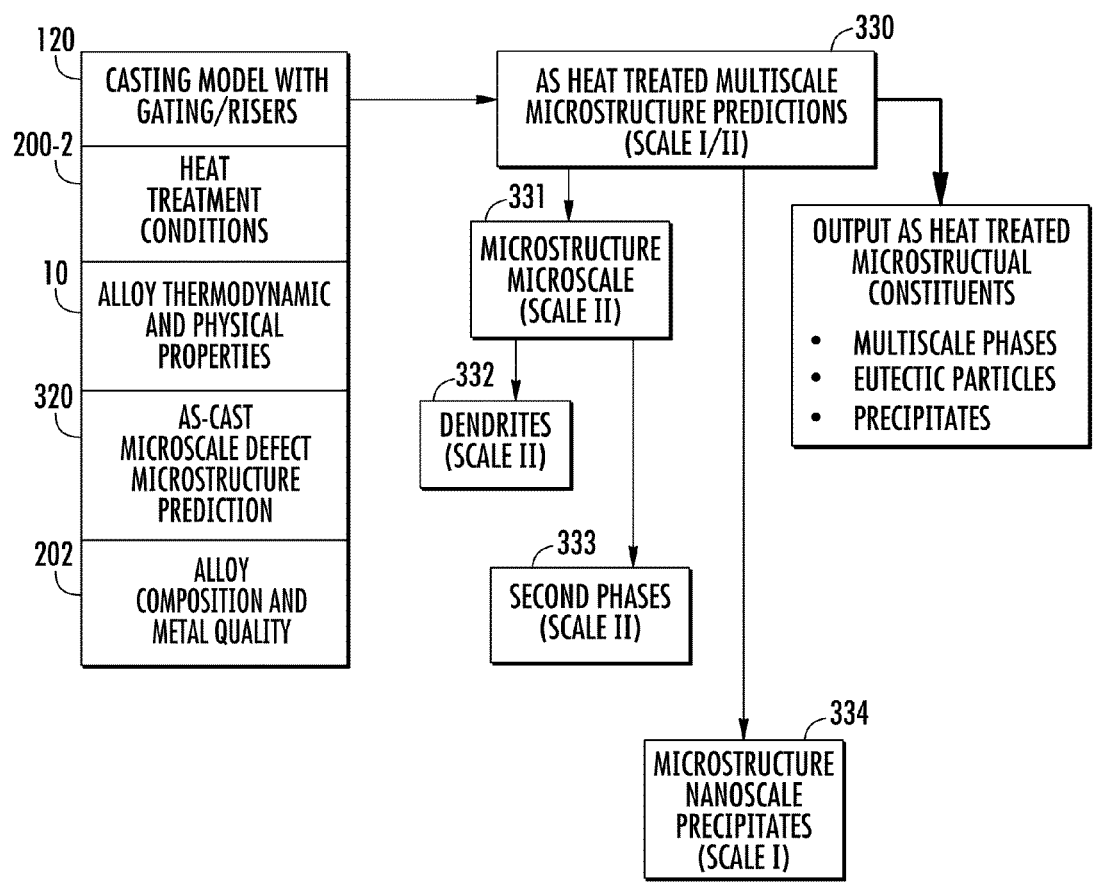

Referring next to FIGS. 4A through 4C in conjunction with FIG. 6, details about multiscale defect and microstructure predictions are shown. Upon receipt of information pertaining to the casting model with gating or riser features from the casting design module 100, casting conditions from the process modeling and optimization module 200, alloy thermodynamic and physical properties 10 and alloy composition, metal quality and casting process from knowledge base 102 of FIG. 2, microstructure prediction module 300 splits into microscale and macroscale analyses. The analysis method selected depends on the scale of the defect or microstructural constituent to be modeled. For example, macroscale (Scale III) defects can typically be seen with the naked eye or a magnifying glass. Common examples of such defects include core gas bubbles, entrained gas and cold shuts. By nature of the physical scale of the defect formation processes, these are modeled using finite element models (FEM), finite difference methods (FDM) or volume of fluid (VOF) methods with nodal dimensions on the order of millimeters to centimeters, to predict defects and microstructural constituents with maximum dimensions on the order of 10 millimeters to a meter. At the smallest extreme, microstructural constituents such as nanoscale precipitates must be modeled to predict the local strength. These Scale I-level predictions are made at nearly the atomic level, employing computational methods such as ab-initio, molecular dynamics (MD), and phase field (PF) calculations to simulate microstructure formation in a total volume less than 1 cubic micron. The Scale I predictions require validation using tools such as the transmission electron microscope at hundreds of thousands of times magnification to resolve the nanoscale precipitates and crystalline structures. The gap between Scales I and III, for defects and microstructural constituents ranging from about 1 micron to 10 millimeters in maximum dimension, is filled by mesoscale and microscale (i.e., Scale II) simulation methods. Scale II methods predict formation of defects such as microporosity and deleterious second phase particles, as well as microstructural constituents such as dendrites, cells and eutectic particles. Computational methods used for the meso and microscale predictions include cellular automata (CA), modified cellular automata (MCA) and PF, and the predictions are verified by observing the defects and microstructure with standard tools such as metallographic light microscopes and scanning electron microscopes at magnifications ranging from 10-10,000 times. It will be appreciated by those skilled in the art that these general classes of size distinctions are somewhat arbitrary, and that some of them may in fact exist in more than one of the aforementioned scales; such will be apparent from the context. Referring with particularity to FIG. 4A, macroscale (Scale III) activities are used to provide defect predictions in the as-cast state (i.e., prior to any post-casting heat treating) for holes, oxides and related defects. Macroscale defects prediction submodule 310 proceeds along two paths, including analyses for fluid flow 312 and solidification 313. From fluid flow 312, information pertaining to oxide bifilms, entrained gas and trapped gas is determined at 314. Likewise, information pertaining to core gas and gross microshrinkage is determined at 315. Details associated with defects such as those in 314 and 315 are discussed in more detail later, including discussion related to FIG. 8.

Referring with particularity to FIG. 4B, a submodule 320 for determining as-cast microstructure and microscale defects is shown. As with the submodule 310 in FIG. 4A, submodule 320 promotes a bifurcated analysis for Scale II defects 321 and Scales I, II and III microstructures 325. In the first analysis, microscale defects 321 includes solidification defects 322 for Scale II which are comprised of microporosity defects predicted from models that operate at Scales I and II, and deleterious phases predicted from models that operate at Scale II. In the second analysis, microstructures 325 includes dendrites and grain boundaries for Scales II and III, second phases such as eutectic reinforcement particles for Scale II, and nanoscale precipitates for Scale I. Output from submodule 320 is used for three things, as shown in FIGS. 1A and 1B. The first of these involves comparing defect predictions 320 to casting quality requirements 220 to see whether the microporosity or other defects exceed allowable values. If the casting quality targets are not met, then the VCCD system 1 iterates on the casting design and process parameters in modules 100 and 200. When the casting quality targets are met, then the predicted multi scale defects and microstructures will be used in structure performance prediction module 400. Additionally, for castings which are heat treated, the predicted as-cast microstructures will be used as input for the heat-treated microstructure prediction 330 that is shown in FIG. 4C. The outputs of the as-cast microscale defect and microstructural constituents depicted in FIG. 4B are compared to the quality specification and used as the decision criterion in submodule 220. If the minimum quality criteria are met, then the microshrinkage data is forwarded to the structure performance module 400. For castings which are not heat treated, the rest of the microstructural details listed as output in FIG. 4B are also forwarded to the structure performance module 400, where they are then used to calculate durability directly from the microstructural size, shape, and arrangement details from submodule 320. If the casting is heat treated, then the output of submodule 320 becomes the starting point for predicting the final "heat treated" microstructure. For instance, it may be necessary to estimate how rounded the sharp plate-shaped eutectic particles become during the heat treating process, where the shape in the as-cast condition from submodule 320 can form the starting point for the prediction in submodule 330 where the corners edges become less sharp as the particle tries to approach a more spherical-shaped state. Such changes in shape may significantly impact the structural response of the microstructure to tensile and related loading.

Referring next to FIG. 4C, the results of the predicted as-cast multiscale microstructure predictions from submodule 320 are then analyzed for heat treatment effects in the as-heat treated multiscale microstructure prediction submodule 330. It will be appreciated that it is not necessary to subject related output from the macroscale defects prediction submodule 310 to the as-heat treated multiscale microstructure prediction submodule 330, as larger scale defects such as oxides, surface connected holes or the like do not change when subjected to most conventional heat treating. However, for components subjected to hot isostatic pressing, the macro and microscale internal porosity from 310 and 320 would be included in the heat treating process model 200-2, distortion predictions 230, and as-heat treated multiscale microstructure prediction submodule 330 to accurately represent the effect of the hot isostatic pressing process on the final dimensional and microstructural state of the component. Quantities determined include microscale microstructure 331, dendrites 332, second phases such as eutectic reinforcement particles and nanoscale precipitates. Output from submodule 330 includes, but is not limited to, multiscale phases, eutectic particles and precipitates.

An advantage of the method as embodied in the multiscale defect and microstructure predictions is that various computational time-saving measures may be employed. For example, information from the macroscale defects prediction submodule 310 can be fed into the tensile failure assessment in submodule 400B (shown in FIG. 5) and the global properties submodule 420A (shown in FIG. 6) without completing the remainder of the detailed analysis to determine if it is necessary to proceed through the remaining steps. In another case, if the residual stresses predicted by the heat treatment model are too high, the software will iterate on heat treatment parameters in 200-2 or propose a product geometry change in 115 without conducting durability or reliability calculations of submodules 440 or 460. In this way, the more complex durability and reliability calculations are postponed until a casting geometry and process design meeting specified quality indicia has been devised. At that point, an accelerated durability or reliability calculation could be made using only the location dependent microstructure, defect, and residual stress information for the surface of the part if the service loads are most likely to trigger surface initiated failures. If this surface node based screening meets the required durability and reliability specifications, then the durability and reliability calculations can be completed for the remaining nodes to look for hidden internal vulnerabilities. Contrarily, if the surface node based screening fails to meet the specification, then the geometry and process redesign activities are re-initiated with refined decision criterion at submodules 120, 220, 240, and 250 before completing the structural performance assessment for the full component. Later, the candidate casting design and processes can be fine-tuned to optimize product durability and reliability by taking advantage of the DOE capability within modules 100 and 200, and linking the DOE output to the stochastic durability and reliability models so that the system provides a robust and minimum cost product and process design. In a further example of a computationally-efficient use of the system, an existing product may be evaluated for a more demanding application, such as a higher power version of an engine. In such case, the current product geometry, microstructure, and defect descriptions from prior design studies could be input to the structural durability model 400 along with the proposed new service or test conditions 430. An accurate assessment of the feasibility of using the current casting design and process could be performed before the geometry and process optimization programs in modules 100 and 200 would be triggered. If the current product geometry, microstructure, and defect descriptions were not available from prior design studies, they could be efficiently generated by inputting the extant geometry and process parameters into the system 1 and not running the optimization options in modules 100 and 200 to generate a new baseline input to the structural durability model 400. Because of the modular nature of the method, the system can be used efficiently by selecting only the functions needed to address the problem at hand.

As stated above, scaling issues can present problems when modeling relatively large components (such as an automotive engine block). FIG. 6 shows with particularity how the various steps associated with the multiscale defects and microstructure prediction module 300 and structure performance module 400 are grouped by columns into one of three general scales the first of which (Scale I) is associated with very small sizes (for example, crystal structures, phase properties, precipitates or the like in ranges as small as 0.1 nanometers), while the second (Scale II) is associated with slightly larger scales (for example, pore shapes, grain/dendrite morphology, eutectics or the like in the 1 micron to 10 mm range) and the third (Scale III) is associated with component-level scales (for example, macroscale casting defects, grains or the like, all between roughly 10 mm and a meter).

The very fine scale material properties of Scale I are extrapolated for use in the multiscale defects and microstructure prediction module 300 to determine the durability, reliability and functionality of large scale properties in an entire cast component in the structure performance module 400. Such extrapolation is needed because the smallest scale (Scale I) can only deal with up to approximately 1 micrometer-sized samples. As such, the casting needs to be divided into a large number of small volume elements. Even with a very small sample, the Scale I method needs a significant amount of computational time (for example, about one week for a 2-dimensional analysis of a 1 $mm^2$ area) to arrive at a solution. As such, it would take a prohibitively long time to simulate the whole casting using Scale I method. To overcome this, the present inventors first use the Scale I method to calculate materials properties of the small (up to 1 micrometer) sample with various casting or heat treatment conditions that might be expected to be encountered in an actual casting or heat treatment situation. Afterwards, correlations between the materials properties and casting or heat treatment conditions are developed, and then the correlations are used to calculate the materials properties of any individual volume (up to 1 micrometer size) based on the casting or heat treatment conditions that the Scale I volume is experiencing. In this way, only a few seconds or minutes of computational time are needed to generate the solution for the material properties of any small volume (up to 1 micrometer). With this knowledge, the method may move up to Scale II, where the maximum size of the sample is larger (for example, up to 10 millimeters). By dividing the Scale II sample into many tiny volumes having Scale I size, the Scale II method then calculates casting or heat treatment conditions for every individual Scale I volume. Based on the casting and heat treatment conditions for each Scale I volume, the material properties of the all individual Scale I volumes within the Scale II sample can then be calculated. Accordingly, the relationship between the casting or heat treatment conditions and materials properties for the Scale II sample size can be developed. The use of all three scale methods cooperate to model a casting in which the local properties and defect populations can vary significantly within the part. By first dividing the casting into the millimeter scale (Scale II) size, a global model is created. VOF & finite element methods (FEM) simulations, shown as submodule 340 in FIG. 6, may be established for fluid flow or thermal and phase transformations. During or after macro simulation, the casting or heat treatment conditions (flow velocity, pressure, hydrogen level, temperature or the like) for each Scale II volume becomes known. This then permits calculation of the materials properties of any Scale II volume within the Scale III model based on the developed correlations and the casting or heat treatment conditions the individual Scale II volume has experienced.

At the large scale of Scale III, various code forms (for example, FEM, finite difference methods (FDM) or VOF methods) are used to provide simulation tools that provide macroscopic information on processing parameters, including thermal, velocity, pressure and stress state, among others. Other code forms, such as Cellular Automata (CA) and Modified Cellular Automata (MCA) are normally thought to be mesoscale computational methods, while Ab Initio and Molecular Dynamics (MD) tools are used to implement nanoscale and atomic scale methods, respectively. Intermediate code forms, such as Phase Field (PF) can be used in either the Scale I or Scale II regimes. As such, CA and MCA methods analyze casting defects and microstructures including pore size and morphology, dendrite grains and eutectic particles for Scale II domains.

The predictions of the multiscale defects and microstructure prediction module 300 are integrated and mapped onto the final part geometry so that local variations in the microstructure, strength and defect population can be accurately accounted for in the structural performance assessments described below. Importantly, by avoiding the oversimplifying assumption of uniform properties at the smallest scale, the present invention allows casting designers and engineers to accurately predict the localized impact of defects and microstructure on a large scale cast component without having to employ a prohibitively unwieldy amount of computer processing time upon scale-up. Looking first at the development and integration of the multiscale tools, a Scale I method is used to calculate material properties of the sample (up to 1 micrometer) with all kinds of casting or heat treatment conditions that might be seen in real casting or heat treatment situation. The validation of Scale I simulation and correlations was performed using a test casting with well-controlled solidification and/or heat treatment conditions, after which correlations are used to calculate the materials properties of any individual volume (up to 1 micrometer size) based on the casting or heat treatment conditions the Scale I volume is experiencing. In this way, only a few of seconds or minutes of computation time is needed to get the solution for the material properties of any small volume (up to 1 micrometer), as a comprehensive (and time-consuming) Scale I simulation need not be run.

From this, Scale II may be initiated, where the Scale II sample is divided into many tiny volumes having Scale I size so that the Scale II method calculates casting or heat treatment conditions for each of the individual Scale I volumes. This permits the materials properties of the all individual Scale I volumes within the Scale II sample to be calculated using the relationships developed for Scale I without running an actual Scale I simulation. Accordingly, the relationship between the casting or heat treatment conditions and materials properties for the Scale II sample size can be developed. Similarly, any individual Scale III volume element can be divided into many Scale II volume samples. The materials properties of any individual Scale II volume sample can be quickly calculated based on the relationships developed without really running the Scale II simulation. As with Scale I, VOF & FEM simulations in submodule 340 for fluid flow, solidification, or heat treatment with given conditions of alloy & melt quality (both shown as part of the knowledge bases 102, 202 of the expert systems 101 and 201 depicted in FIGS. 2 and 3, respectively), casting/gating geometry 20, casting process parameters 200-1 (as shown in FIG. 1A), 200-1B (as shown in FIG. 1B) or heat treatment parameters 200-2 are performed. During or after macro simulation, flow velocity, pressure, hydrogen level, temperature and related values are established for each Scale II volume. This allows calculation of the macro/meso scale casting defects or grain sizes 310. Meanwhile, the calculated flow velocity, pressure, hydrogen level, temperature and other information of each Scale II volume in CA/MCA/PF submodule 350 will be used as boundary conditions for micro submodule 321, 325, 331 that will be used to calculate (among other things) the microporosity, DAS, or eutectic particle structure, after which the local mechanical properties of each Scale II volume can be calculated in submodule 420B. Similarly, the calculated flow velocity, pressure, hydrogen level, temperature and other information of each Scale I volume in submodule 360 will be used as boundary conditions for PF/MD/Ab initio simulation 328 and 334. The nanoscale crystal structure and precipitates can be thus calculated in submodules 328, 334, after which the yield strength and aging strengthening of each Scale I volume can be calculated in submodule 420C. The calculated yield strength can be further used for accurate prediction of local tensile and fatigue properties in submodule 420B. From this, the local mechanical properties of the entire casting component can be calculated in submodule 420A. The durability analysis of the entire cast component can then be estimated in submodule 440 based on the global property output plus input from a given load and stress state in submodule 430. A reliability estimate in submodule 460 can be made for the total population of a given cast component used in a given fleet application by statistical treatment of the durability analysis output from submodule 440. For instance, a Monte Carlo simulation of varying operational loads could be run to determine the warranty costs for the casting design and process selected.

Referring again with particularity to FIG. 4B, to get an accurate prediction of the cast component's response to loading, it is preferable to represent each microstructural component in terms of strength, size, shape and interfaces between the components, as well as the probability of a defect of a given size and type being present at that location. The interplay between scales requires creation of an accurate representation of the physical interactions between the system components. For example, the eutectic particles and precipitates are shown as outputs for both the as-cast and as-heat treated microstructures 320, 330 (of FIGS. 4B and 4C, respectively) because the heat treatment affects the size, shape, and volume fraction of eutectic phases, while the dendrites are included as outputs to take into consideration the effect of diffusion on the nanoscale precipitate distribution after heat treatment. Likewise, the inclusion of microporosity defects 323 (predicted from methods operating at Scales I and II) is required to fully represent the impact of the presence, size, aspect ratio, and number density of this type of defect on the component's response to loading. Further details of the microporosity prediction methods are discussed as follows.

The previously-discussed CA may be used to predict pore volume fractions and pore sizes at different process operating conditions. These may then be correlated to produce an equation for maximum pore length. Regression equations are then applied within a macromodel of a complete casting, allowing for a simplified application of CA to a large model. Such an approach facilitates multiscale computational method integration. Microporosity may also be modeled using integrated interdendritic flow and pore growth models to account for the effect of both shrinkage and hydrogen diffusion. In addition, the use of predicted oxide particles in the liquid aluminum after mold filling as microporosity nucleation sites according to the present invention improves accuracy in that it need not arbitrarily assume a number of gas pore nucleation seeds in the liquid aluminum.

Referring again to FIG. 4C, the effect of heat treatment on multiscale microstructure predictions 330 of the as-cast component is shown. As with the output shown in FIG. 4B for the as-cast microstructures, the eutectic particles and precipitates (among other things) are shown as outputs for the heat-treated microstructures, although in this instance because the heat treatment affects the size, shape, and volume fraction of eutectic phases. In some situations, a cast component is heat-treated with the gating and risers still attached, while in other situations, the cast component has been partially machined, with the gating and risers having been removed prior to heat treatment. As such, the basis for such a geometry is the casting design output 120 decision (depicted in FIGS. 1A and 1B), as modified to reflect the actual process conditions. In one example, the cooperation between submodules 200-2, 230 and 250 may be used to model an engine block which was originally planned to be heat treated with the riser still attached. An analysis result from 200-2 and 230 could predict that high residual stress after quenching could lead to part cracking prior to any service loading. Such an outcome would result in a "NO" output decision point at submodule 250 of FIGS. 1A and 1B. In response, system 1 would have the model be revised to indicate that it would be preferable to cut off the riser prior to heat treatment as part of the heat treatment optimization process, shown in submodule 200-2 (also as shown in FIG. 1A).

Referring with particularity to FIG. 6, initial microscale simulations with CA/MCA/PF methods in submodule 350 and nanoscale simulations with PF/MD/Ab Initio methods in submodule 360 are performed separately. As stated above, a test casting can be initially used to calibrate these models. The information from the simulations in submodules 350 and 360 are then fed to respective correlation models in submodules 321, 325, 331 and 328, 334 so that the smaller scale microstructure constituents of any real casting component can be simulated by using one or both of the local solidification and heat treatment conditions of the component which can be calculated using macroscale VOF & FEM methods of submodule 340. The boundary conditions for the next smaller scale model come from the output of the next biggest model; the CA/MCA/PF methods of submodule 350 rely on the time-temperature input from the VOF & FEM model of submodule 340 to simulate how the metal will freeze in a small volume. The nanoscale models of how atoms form precipitates within the CA/MCA/PF volume depend on the thermal history from the outside environment (via the VOF & FEM model 340) and the initial conditions of the solid casting produced by the CA/MCA/PF model 350 on the micron scale. This not only ensures the accuracy of subscale calculations (by including crystal structures, phase properties and precipitates into a subsequent extrapolation to a larger scale) but also keeps the simulation time of a real casting component (such as an engine block or cylinder head) to a manageable duration (for example, within one week).

Such tractable level of computation is achievable because the method of the present invention doesn't have to model solidification of every location in the component of interest on the micron scale and then predict how the atoms rearrange themselves during the heat treatment process every time a new part is simulated. This is enabled through a fine-tuning of the models so that all that is needed to make a good prediction is the thermal, velocity and pressure histories and composition at a given location. Such an approach ensures that a full design or development loop is employed, thereby permitting that predicted properties can be used to modify the casting design and process optimization from modules 100 and 200 based on accurate characterization of the material properties from the smallest scale to the largest.

The initial product geometry and property requirements 20, 30 are used as input in the form of casting, gating and mold geometry models into the VOF & FEM submodule 340 that is part of the predicted multiscale defects and microstructure prediction module 300. Likewise, the alloy compositions and melt quality from knowledge bases 102, 202 of the expert systems 101, 201 of FIGS. 2 and 3, respectively, casting process parameter input 200-1 and 200-4 and heat treatment parameter input 200-2 are input into the same submodule that is used for mold filling and casting solidification process simulation. Such information is also input (via VOF & FEM submodule 340 to first get macro scale distributions of temperature, pressure and related quantities in the whole casting) into micro-level and nano-level submodules CA/MCA/PF 350 and PF/MD/Ab initio 360 that are part of the predicted multiscale defect and microstructure distributions from multiscale module 300.

Referring again to FIG. 5, accurate global property predictions 420A cannot be made unless the macroscale and microscale defect population is coupled with accurate macro/mesoscale strength predictions. In the case of fatigue life prediction, a mere treatment of only one type of microscale defect (for example, microporosity) is inadequate to properly assess the cause of fatigue cracks. Instead, the present invention treats a wider range of physically relevant defect states, from macroscale (such as voids created by core gas) to the other extreme of defect-free metal at a particular location subjected to stress. Accounting for interactions between oxide bifilms, dissolved hydrogen, and solidification conditions facilitates an even more accurate prediction of the microporosity size distribution rather than relying upon empirical models that overlook the significant effects of oxide bifilms on the location and maximum size of pores. With particular regard to tensile failure assessment prediction (shown as submodule 400B of structure performance module 400), reliance upon predicting the yield strength of the dendritic components of the microstructure without accounting for the large volume fraction of the structure that is a composite of eutectic particles and matrix material with a different precipitate distribution than that of the dendrites can limit the accuracy of the system response. The present invention addresses the composite nature of the cast microstructure by integrating the predicted strength of the individual components as well as the behavior of the interfaces between them, to better represent the system response. Because tensile failure begins even below the 0.2% yield strength, when the eutectic particles crack or debond from the matrix, the tensile strength prediction must account for the microscale size and shape of the eutectic particles as well as the nanoscale behavior at the particle-matrix interface. This reduces errors that could otherwise arise by inaccurately representing the onset of tensile failure in the cast microstructure.

Creep predictions (as will be discussed in more detail below and shown as submodule 400C) may also be an important determinant of component performance, not only for components that subjected to large thermal cycles (such as an automotive cylinder head), but also for bolted or press fit joints that lose clamp load when the metal creeps. Loss of clamp load can cause loss of sealing function, and wear when parts move relative to each other at the loose joint.

Defect and microstructure-dependent mechanical properties submodule 420 are shown in greater detail in FIG. 6 as global properties submodule 420A, tensile/creep/fatigue and dispersion hardening properties submodule 420B and yield strength/aging strengthening properties submodule 420C. As discussed above, the mechanical properties receive respective input from the Macro/Meso 310, Micro 321, 325, 331 and Nano 328, 334 submodules of the multiscale module 300. Referring again to FIGS. 1A and 1B, residual stress and distortion predictions 230 and service/test conditions 230 are shown as being input into durability analysis 440 and reliability analysis 460 submodules of structure performance module 400. The material's thermodynamic and kinetic properties 10, which are needed for the multiscale simulation, are shown as input to VOF & FEM submodule 340, CA/MCA/PF submodule 350 and PF/MD/Ab initio submodule 360.

After each simulation, macro and micro defect results can be predicted in a quantitative manner. Unlike current commercially available prediction tools, the code used in conjunction with the present invention can give quantitative predictions of casting defects (volume fraction, sizes and number density) in the entire cast component. For each location in the casting, a list of defect types that are predicted to be present, their sizes, and the likelihood that they are present can be created. For instance, the fluid flow portion 312 of the casting model would output predictions of the size, number, and locations of bifilms formed due to turbulent metal flow shown in FIG. 4A as oxide bifilms, in addition to the volume and locations of entrained gases and trapped gases 314. The thermal history and metallostatic pressure around cores would be used to predict formation of core gas bubbles 315, and where they are likely to be found in the event they penetrate the metal. The porosity predictions for the microporosity formed during solidification would include the maximum size and volume fraction at various locations in the casting 323. The defects predicted by a number of different models are mapped onto the final part geometry so that durability and reliability assessments under submodules 440 and 460 respectively can be made.

Referring again to FIG. 1A, with the casting process modeling and optimization module 200, the casting process parameters such as metal temperature, melt filling profile, mold materials, chill location or the like can be optimized for minimal casting defects. In an additional distinction over commercial software packages such as those mentioned above, the present inventors have developed module 200 to predict various casting defects, such as microporosity, core gas, oxides, cold shuts, misruns, bifilms or the like. This module 200 also selects and optimizes (using the knowledge base 202 of FIG. 3) the heat treatment and machining processes 200-2, 200-3 to minimize residual stresses, distortion, and manufacturing cost.

Referring again to FIGS. 4A through 4C in conjunction with FIG. 6, the multiscale defects and microstructure prediction module 300 simulates and predicts populations of defects and microstructure constituents in every node of the component being modeled. Part of this includes calculating macroscale submodule 310 (i.e., millimeter scale) static (thermal, pressure, solute concentration) and dynamic (velocity) properties of every node in the entire casting. This information is used in macroscale 310 to calculate the corresponding scale casting defects (such as porosity, oxides, core gas, bifilms or the like) and Micro/Meso 320 to calculate microscale defects (such as microporosity and microstructure features (such as DAS) and grain size) for every node in the entire casting. The calculated casting defect information is then fed to both Micro 320 and Nano 330 submodules within the predicted multiscale defect and microstructure distributions 300. In the Micro 320 submodule, the detailed micro features (such as porosity/oxide morphology, grain and dendrite morphology, and eutectic particle size and shape) are calculated based on micro models generated in submodule CA/MCA/PF 350. The micro models used in Micro 320 submodule are calibrated with generic experimental data from well-controlled test castings. Similarly, Nano submodule 330 is configured such that the detailed nanoscale microstructure features (such as crystal structure, phase properties, size and shape of precipitates) are calculated based on the nano models developed in PF/MD/Ab initio 360 and heat treatment conditions provided in heat treating 200-2. The nano models used in Nano submodule 330 are also calibrated with generic data from the test casting. It should be noted that the nanoscale properties calculated in Nano submodule 330 can be used in microscale calculations in the Micro 330 submodule. The predicted multiscale microstructure features are for material property and structure performance predictions. The nanoscale features predicted in Nano submodule 330 are mainly for yield strength prediction using precipitation hardening models in the yield strength/aging strengthening 420C submodule. Combined with microscale features predicted in Micro 320 submodule, the nanoscale features are also used in tensile and fatigue property prediction of defect-free material from the tensile/creep/fatigue dispersion hardening properties 420B submodule. With the macroscale information pertaining to porosity and DAS, the tensile and fatigue properties of materials containing defects can be predicted as in the global properties 420A submodule. With the predicted local material properties and loading stress from service stress state analysis 430 submodule and residual stresses and distortion 230 submodule, the local material performance and failure probabilities can be calculated for the entire component.

The predicted multiscale defect and microstructure distributions from module 300 are then utilized in the structure performance module 400 to predict nodal-based mechanical properties as well as durability of the component being modeled when the stress state is known. Various steps, including predictions of residual stress and distortion 230, mechanical properties 420, service stress state 430 and durability and reliability 440 are used to reach component performance indicia. A decision tree or related logic element is used to determine if the predicted properties and durability meet a predetermined set of requirements (such as customer requirements 450); if so, then the system 1 settles upon the modeled product casting as being optimal and conveys such information to an appropriate file, data set or related form of output. Otherwise, the information is sent to a product geometry redesign 115 that can be fed into casting design module 100 for modification of one or more of the various manufacturing processes, such as casting, heat treatment and machining.

With regard to microporosity, the present inventors discovered that, rather than using an empirical equation based on the dendrite spacing, it is preferable to establish a correct physical description of the way pores form to allow a more accurate prediction of the biggest pores. This includes factoring in the effect of different amounts of hydrogen dissolved in the metal on the porosity formation process, as well as accounting for oxide bifilms in the liquid that provide favorable sites for the hydrogen to come out of solution to make pores. The amount of hydrogen in the liquid aluminum can vary by a factor of two in part production. The treatment of hydrogen in the pore growth model of the present invention, while analogous to prior diffusion models, importantly coupled both pore growth by hydrogen diffusion and shrinkage from liquid to solid together during microporosity simulation, whereas prior models treated the two mechanisms separately, causing pore sizes to be underestimated. Even accounting for the hydrogen levels, consideration of oxide bifilms as a factor in predicting the size of the biggest pores should be considered, where pore sizes can be significantly bigger (for example, by a factor of three to ten) when an oxide film is present. The oxides create a convenient place for the hydrogen atoms to come out of solution, the hydrogen accumulates and pushes the bifilms apart to provide a favorable place for a crack to start. A pore size prediction that ignores the effects of oxide bifilm defects will underestimate the potential impact of this defect that may place significant limits on the part's performance.

In addition to factoring in the effects of hydrogen level and the oxide bifilm providing a convenient location for the hydrogen to precipitate and make a bigger pore, the models made in accordance with the present invention may be used to predict where oxide bifilms formed when the metal rushes into the mold cavity are most likely to be concentrated, in addition to how many there are. Such prediction may be helpful during casting optimization. In particular, optimizing the runners and the casting geometry can reduce the amount of oxide bifilms formed during mold filling. Such optimization helps prevent subsequent part leaking and cracking.

In addition to consideration of oxide bifilms, core gas should be considered. Core gas bubbles form when the aqueous or polymer binder that holds a sand core together to make a hole or passage in the final part is heated and starts to offgas or pyrolize. If the core is surrounded by metal (such as in an oil passage line), it might be easier for the gas bubble to escape from the sand core through the metal than to escape into the sand around the outside of the casting. Such core gas bubble can cause three problems. First, it can be trapped in the part, displacing the intended structure with a gaseous void. Second, if the core gas bubble forms on a surface or subsurface that is subsequently machined (for example, at the head gasket area), it can cause sealing problems, as well as part rejection in a subsequent quality-assurance check. Third, the bubble leaves a nearly continuous trail of oxides in its wake, which may induce hydrogen to come out of solution to create an aligned row of holes which can weaken the casting.

Figure 7:
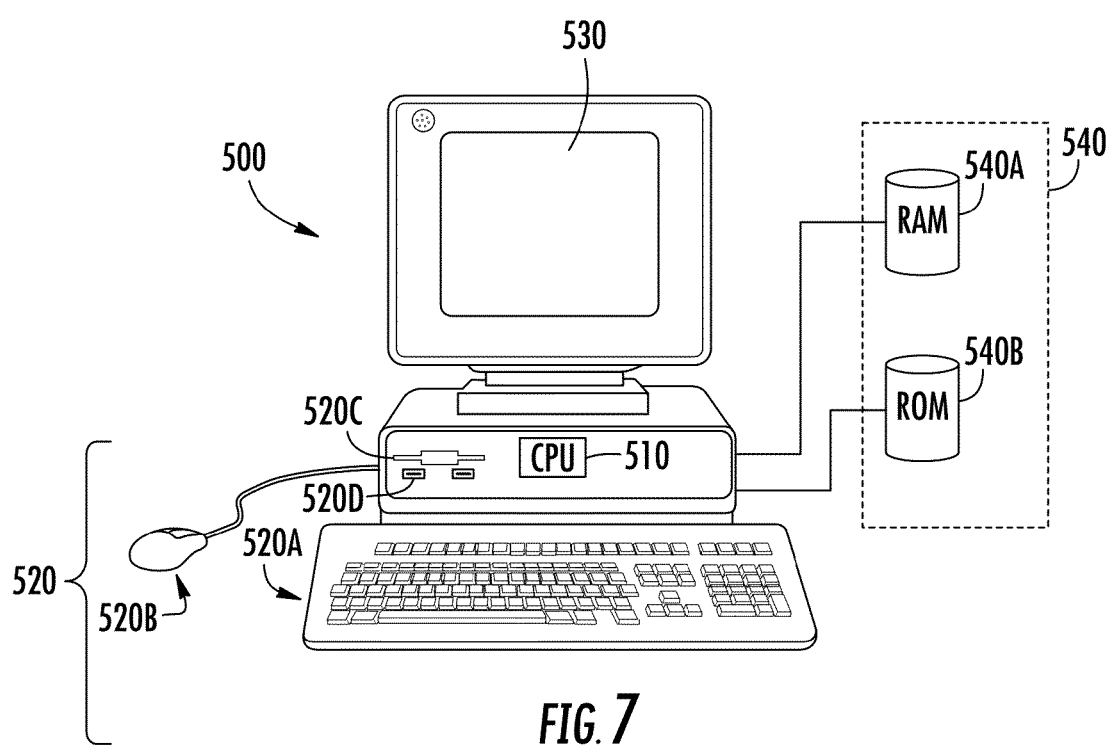
FIG. 7 shows the system of FIGS. 1 through 6 implemented on a computer according to one embodiment of the present invention.

Referring next to FIG. 7, in one aspect, the system 1 is configured as a computer 500 or related data processing equipment. The computer 500 (regardless of whether configured as an autonomous device, workstation, mainframe or other form) includes a processing unit 510 (which may be in the form of one or more microprocessors), one or more mechanisms for information input 520 (including a keyboard 520A, mouse 520B or other device, such as a voice-recognition receiver (not shown), as well as an optical disk loader 520C or USB port 520D), a display screen or related information output 530, a memory 540 and computer-readable program code means (not shown) to process at least a portion of the received information relating to the aluminum alloy. As will be appreciated by those skilled in the art, memory 540 may be in the form of random-access memory (RAM) 540A (also called mass memory, which can be used for the temporary storage of data) and instruction-storing memory in the form of read-only memory (ROM) 540B. In addition to other forms of input not shown (such as through an internet or related connection to an outside source of data), the optical disk loader 520C or USB port 520D may serve as a way to load data or program instructions from one computer-usable medium (such as CD-ROM, flash drives or the like) to another (such as memory 540). As will be appreciated by those skilled in the art, computer 500 may exist as an autonomous (i.e., stand-alone) unit, or may be the part of a larger network, such as those encountered in cloud computing, where various computation, software, data access and storage services may reside in disparate physical locations. Such a dissociation of the computational resources does not detract from such a system being categorized as a computer.

In a particular form, the computer-readable program code means corresponds to the one or more modules 100, 200, 300 or 400 that can be loaded into ROM 540B. Such computer-readable program code means may also be formed as part of an article of manufacture such that the instructions contained in the code are situated on a magnetically-readable or optically-readable disk or other related non-transitory, machine-readable medium, such as a flash memory device, CD-ROM, DVD-ROM, EEPROM, floppy disk or other such medium capable of storing machine-executable instructions and data structures. Such a medium is capable of being accessed by a computer or other electronic device having processing unit 510 used for interpreting instructions from the computer-readable program code of the numerous computational modules 100, 200, 300 or 400. As will be understood by those skilled in the computer art, a computer 500 that forms a part of system 1 may additionally include additional chipsets, as well as a bus and related wiring for conveying data and related information between processing unit 510 and other devices (such as the aforementioned input, output and memory devices). Upon having the program code means loaded into ROM 540B, the computer 500 of system 1 becomes a specific-purpose machine configured to determine an optimal cast component in a manner as described herein. Data corresponding to a proposed component (for example, a cast aluminum alloy engine block) may be in the form of a database that may be stored in memory 540 or introduced into computer 500 via input 520. Likewise, casting design data and rules such as that embodied in the various modules can be stored in memory 540 or introduced into computer 500 via input 520. In another aspect, system 1 may be just the instruction code (including that of the various modules 100, 200, 300 or 400), while in still another aspect, system 1 may include both the instruction code and a computer-readable medium such as mentioned above.

It will also be appreciated by those skilled in the art that there are other ways to receive data and related information besides the manual input approach depicted in input 520 (especially in situations where large amounts of data are being input), and that any conventional means for providing such data in order to allow processing unit 510 to operate on it is within the scope of the present invention. As such, input 520 may also be in the form of high-throughput data line (including the internet connection mentioned above) in order to accept large amounts of code, input data or other information into memory 540. The information output 530 is configured to convey information relating to the desired casting approach to a user (when, for example, the information output 530 is in the form of a screen as shown) or to another program or model. It will likewise be appreciated by those skilled in the art that the features associated with the input 520 and output 530 may be combined into a single functional unit such as a graphical user interface (GUI), such as that shown and described in conjunction with an expert system in U.S. Pat. No. 7,761,263 that is owned by the assignee of the present invention and the contents of which are hereby incorporated by reference.

Referring next to FIGS. 2 and 3, the inventors envision the knowledge bases 102, 202 to be preferably of the machine-readable variety that can store knowledge (for example, casting design data) as shown. With particular regard to FIG. 2, the data may be in the form of a set of rules such that an algorithm (such as that embodied in inference engine 105) can be used to have automated searching, pattern matching and deductive reasoning applied to initial casting geometry, gating/riser system design and related information in order to perform computational simulations for further optimization. Such features are especially beneficial in reconciling the problems associated with the multiscale aspects of the modeled component, as will be discussed in more detail below. The expert system 101 allows production of a final casting design indicative of the geometric representation of module 100 and a manufacturing procedure indicative of at least one of the casting process, heat treating and machining of process optimization module 200. The expert system 101 includes some non-algorithmic expertise (which may exist in knowledge base 102 that includes "if-then"-like rules or related declarative representations of the expert's knowledge).

Once input data is fed into system 1 through a GUI 107 or related input device, the casting design module 100 (as well as at least the process optimization module 200, as discussed below) can act as expert system 101 to cooperate with the remaining modules 300 and 400 to produce a final casting design. For example, the initial product geometry 20 is fed into a geometry analyzer 103, which generates the geometry characteristics of the product or component to be cast. Model data from the geometry analyzer 103 is fed into the aforementioned inference engine 105 which is adapted to generate casting designs by first searching a knowledge base 102 that includes alloy properties, casting processes, gating and riser data and design rules. From this, it performs pattern-matching operations, and implements logical processes. Furthermore, a process simulation submodule 108 runs process simulations on the casting designs generated by the inference engine 105, while an optimization submodule 104 that optimizes the casting designs generated by the inference engine 105.

In one exemplary embodiment, the initial product geometry of the component to be analyzed is provided as a CAD geometry model, examples of which include *.stl; *.prt; or *.x_t file formats that can be used by Unigraphics™ or related code. In the casting design module 100, the initial geometry model is analyzed by the geometry analyzer 103 as mentioned above to determine the geometry characteristics (such as minimum hole size, minimum wall thickness, maximum wall thickness, geometric modulus, three-dimensional dimensions, machining surfaces or the like) for casting and gating system design. Based on the casting design rules contained in the knowledge base 102, the casting and gating system of the component is roughly designed.

In one form, the inference engine 105 may implement a data-driven forward chaining algorithm common among rule-based systems in that it starts from available information, adds new assertions along the way and then tries to draw conclusions in a manner more efficient than that associated with resource-intensive searching. Inference engine 105 also employs a rule set and an inference component the latter of which applies the rules based on the state of information in the working memory. From a logic flow perspective, inference engine 105 receives model data (such as from initial product geometry 10) and a premise set generated by the GUI 107 that are in turn based on the casting design specifications 106. Execution cycle of the inference engine 105 includes a logical "do while" loop that repeats itself until the value of a variable in question is found to be true such that a final casting design 120 is produced. Since the design of the inference engine 105 is based on the rule set, rule templates may be established. Object oriented programming may also be included to enable object inheritance and classes, and design principles and knowledge collected may be represented in the form of these templates. The value of other Boolean variables may be determined in a similar manner. An expert system shell (for example, C Language Integrated Production System (CLIPS) or a related efficient pattern matching Rete algorithm for implementing design rule systems) can be used to provide efficient rule-based pattern-matching and performance gain increases. Object-oriented and procedural programming protocols that facilitate modularity, fuzzy logic and related agents are additional advantages of a CLIPS-based expert shell system.

The macroscale VOF simulation is used to build the code to simulate fluid flow, heat transfer, and casting defects. Such VOF coding can be achieved by either well-known commercial means, or by comparable proprietary equivalents. The simulated mesoscale or nanoscale as-cast microstructures are then subjected to heat treatment optimization per task, tool or submodule 200-2. In the heat treatment modeling and optimization of task, tool or submodule 200-2, the residual stress and distortion is modeled using a macroscale FEM. The heat treated microstructure (eutectic and in particular precipitate structure) is modeled using a nanoscale phase field method. The stress levels determined by the simulated heat treatment process of task, tool or submodule 200-2 can be used to indicate locations with a propensity for forming cracks. After heat treatment, the virtual cast component is subjected to machining, as shown in the machining modeling and optimization task, tool or submodule 200-3. The machining process is modeled using a macroscale FEM for residual stress and distortion redistribution as a way to help identify crack formation and dimensional accuracy of the finished machined product. Specifically, the virtual cast component model is analyzed for nodal-based property mapping using micromechanics-based property models coupled with multiscale casting defects and microstructure populations. Referring again to FIGS. 1A, 1B and 6, the durability of the virtual cast component is analyzed in submodule 440 on the basis of stress derived from the service/test conditions submodule 430 and residual stress and distortion predictions submodule 230 and the mapped mechanical properties of submodules 420A, 420B and 420C using a macroscale VOF & FEM submodule 340.

The process optimization module 200 of FIG. 3 may utilize inference engine 205 and knowledge base 202 as part of an expert system 201 in a manner similar to that depicted in FIG. 2 for the casting design module 100 in order to conduct process simulation and optimization. For example, geometric data from the virtual casting of the casting design module 100 is analyzed for compliance with a geometric design rule of casting manufacturing principles to determine a geometric feasibility of casting model with gating/risers and alloy process recommendations 20. Thus, while there are a number of design rules with respect to the casting geometry to be followed in casting design, there are certain limitations on such geometry, examples of which include a minimum castable hole diameter, minimum castable radius, minimum wall thickness or the like. In one particular form, the simulated casting data from casting design module 100 is evaluated by a casting evaluation tool that is made up of process modeling tools and casting defect prediction modules; such features are part of the process simulation software of process optimization module 200 to determine the formation of casting defects that can in turn be used to determine the feasibility of the casting design that is produced by the casting design module 100. At least one of the geometry analyzer and various evaluation tools (such as a casting evaluation tool, a residual stress evaluation tool and a machining evaluation tool) may recommend a modification to a first estimate of the casting design in order to improve manufacturing in situations where the casting design is inadequate based on geometric design rules for casting, the potential for casting defects, cracking or excessive residual stress after solidification or quenching, potential to crack during machining, or inability to meet the required dimensional tolerances of the finished component. In other words, to make an optimum part based on the present invention, a first step involves making a good casting. To achieve this, the initial steps in the casting design module 100 are aimed at getting a practical rough draft that is capable of refinement in the process optimization module 200. The refined geometry and process parameters from module 200 are needed to predict the microstructure and defect inputs in the casting defect and microstructure prediction (i.e., microstructure) module 300, while the predictions from module 300 are needed for durability calculations in the product performance module 400.

The following paragraphs give examples showing how to calculate some multiscale defects and microstructures according to an aspect of the present invention. The theoretical basis for pore growth models is that pore growth is governed by the rate at which hydrogen diffuses to the pore/liquid interface. These pore growth models were developed for microporosity simulation. Diffusion equation (1) below is for a specified volume of material surrounding a spherical pore of a specified initial radius. Hydrogen rejected to the liquid phase during solidification is represented by the source term $S_H$, given in equation (2).

$$\frac{\partial \rho C_H}{\partial t} = \nabla(D_H \nabla C_H) + S_H \tag{1}$$

$$S_H = \frac{\partial}{\partial t}\left(C_H^0 \bigg/ \left(1 - \left(1 - \frac{K_s}{K_l}\right) \cdot f_s\right)\right) \tag{2}$$

The diffusion equation (1) is then solved in spherical coordinates while solidification proceeds, with boundary conditions given by first by hydrogen concentration in the liquid ($C_H$) at a pore interface ($R_{pore}$) that is in equilibrium with the hydrogen gas pressure ($P_g$) in the pore in accordance with Sievert's Law; and second by zero flux of hydrogen at an outer radius ($R_{system}$). This forms a porosity prediction model that is more comprehensive than an empirically-based approach known in the art.

As stated above in conjunction with FIGS. 4A through 4C, various types of casting defects should be taken into consideration in order to properly characterize aluminum alloy casting. In a configuration where sand casting is employed, polymer or clay binders used to form sand molds can evolve water vapor upon heating. Polymer binders can combust, releasing water vapor and $CO_2$, and also pyrolyze to give off low boiling point molecular hydrogen $H_2$ and hydrocarbons such as propane and methane. Clay materials used as binders in the mold or in core washes can give off water vapor as the hydrated oxides/silicates/carbonates are heated. Water vapor will be reduced at the surface of the liquid metal introducing hydrogen into the metal, and hydrogen in the core gas can simply diffuse into the metal. As a result of hydrogen diffusion from the aforementioned sources into the liquid metal, it is possible to have initial hydrogen concentrations in the casting which are much higher than would be expected from a measurement of hydrogen concentration in the liquid metal at the furnace. This causes increased porosity particularly at the surface of the casting in contact with the sand mold. The multiscale defects and microstructure prediction module 300 includes the submodules, tasks, tools or related subroutines discussed above to predict this offgassing phenomenon. This is significant, in that traditional porosity predictions assume that the hydrogen measured in the liquid metal in the furnace (before it enters the mold) is all the hydrogen that needs to be accounted for. In reality, the offgassing (with its attendant increase in micropore size (at best) or macroscale bubbles (at worst)) must be taken into consideration. When released from sand cores, this offgassing is referred to as the aforementioned core gas, but it will be appreciated by those skilled in the art that water vapor from a number of sources is also possible. Likewise, the exact chemical nature of the gas affects the defect formation mechanism, as hydrogen dissolves into the liquid metal in the atomic form and can come out of solution away from the original source when the metal freezes, while other hydrocarbons that are not soluble in the metal may form isolated bubbles. In one form, the portion of the multiscale defects and microstructure prediction module 300 can apply an external hydrogen concentration from the sand mold as a boundary condition to a simulation of liquid aluminum during solidification. The concentration can be explicitly stated, or numerically calculated from formation and transport kinetics for hydrogen and water in the air space in the sand mold. Such an approach can provide a more accurate assessment of such offgassing relative to a zero flux boundary condition on the hydrogen concentration at the mold surface. The understanding of dissolved hydrogen is an important component to understanding microporosity. Importantly, by factoring in the effect of different amounts of dissolved hydrogen and properly characterizing the physical description of the way the pores form, the present inventors discovered that simplifying empirical equations (such as those based on dendrite spacing) and their concomitant errors are not needed as a way to predict the presence of larger pores. Taking into consideration oxide bifilms as a place for the hydrogen to come out of solution and subsequently produce large pores further enhances the approach of the present invention.

Figure 8:
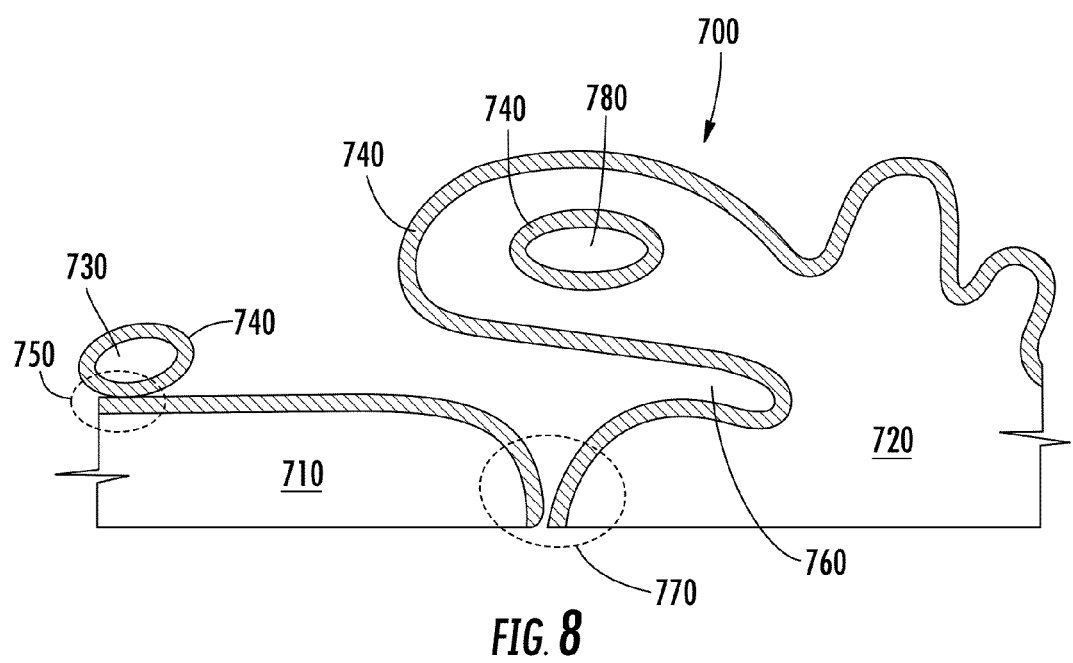
FIG. 8 shows the formation of a bifilm, entrained gas and a cold shut.

Referring next to FIG. 8, a few forms of such defect in an aluminum alloy are shown. Upon heating into liquid form 700, various streams of aluminum (for example, first stream 710 and second stream 720, as well as droplets 730) interact in varied ways. When processed in an oxygen-containing environment, oxide films 740 may form on the outer surface of the liquid aluminum, including the first stream 710, second stream 720 and droplets 730. A bifilm 770 forms when the two oxide films 740 from respective streams 710 and 720 meet. Bifilms also form when turbulence-induced droplets land on the metal stream, as shown at 750. While bifilms 750, 770 are an inherent part of almost every casting process, they are generally not detrimental to casting mechanical properties unless the oxide film 740 is entrained in the bulk of the alloy, as shown at location 760 due to the folding action when two separate streams 710 and 720 meet at large angles (typically more than 135 degrees, where the splashing action of one stream collapses onto another stream to form a cavity therebetween). Such a formation can have significant impacts on overall material integrity and subsequent casting scrap rates. Likewise, entrained gas 780 may form from the pouring action of liquid metal.

Flow marks and cold shuts are other types of bifilms that may additionally be formed. In simulation, the area of contact is stored for each particle, allowing the total potential bifilm area to be calculated by summation over all such particle surface areas. Flow marks (not shown) are tracked as bifilms which are created at temperatures below the liquidus. Cold shuts (which are one form of bifilm 770) form when two streams of liquid metal are too cold to bond when they meet such that the oxide surface on the outside of both metal streams prevents the streams from fusing together; more particularly, they are tracked as bifilms which are created at temperature below the median temperature of the freezing range (i.e., (liquidus+solidus)/2). Cold shuts are potentially detrimental in that they act like cracks in the part and can be quite large. As with turbulence induced bifilms, the total area of flow marks and cold shuts can be calculated by summation over all particle areas as an index of casting quality. Furthermore, the total area of entrained or surface oxide films can be calculated by tracking the free surface area change during mold filling. The model of the present invention may be used to indicate where the cold shut is likely to form, estimate how big it is and how much impact it would have on the part performance, and to suggest what options may be used to eliminate it. For example, geometry and process optimization steps present in the model of the present invention may be used to reduce or eliminate cold shuts. Examples may include increasing the metal temperature when it enters the mold, or changing the filling path to avoid converging streams. Likewise, changing the filling path so the metal doesn't lose as much heat before it meets the other stream could be used to eliminate the cold shut defect.

Yet another macroscale-sized defect that can be considered is entrained gas 780. When liquid metal is poured or forced into a mold, it is possible to trap large gas bubbles therein. If gating components aren't properly shaped, significant amounts of gas may be aspirated into the mold. In some casting approaches (for example, high pressure die casting and squeeze casting processes), the metal fills the mold faster than the gas can be evacuated from the mold cavity, causing metal to surround the trapped gas. The gases inside the mold/die may result from die coating, die lubricant or mold binders.

To describe dendritic structure, primary dendrite cell spacing ($d_1$) and SDAS ($d_2$) are used. The dendrite size and spacing affect the response to heat treatment as well as the mechanical response of the system. Similarly, the size and spacing of what are known as the second phase particles—the eutectics—affects the mechanical response of the composite system. The "V" and "G" in Equation 3 below are directly related to the solidification conditions; as such, the macroscale model of the solidification thermal history is used to predict the microscale cast structure. Equation 4 incorporates details of the alloy composition to predict the local freezing time, which affects pore size, as once the metal freezes the hydrogen can no longer inflate the pores. This is another link between the macro and microscales, based on accurate physical descriptions of atomic scale events through $C_{ri}$, $D_{ii}$, $k_i$, $m_i$ or the like. For second phase particles, particle diameter (a), particle spacing ($\lambda$) and particle length (l) are used. Analytical models for each of these parameters are given by the equations below:

$$d_1 = CV^{-n_1} G^{-n_2} \tag{3}$$

where C, $n_1$, and $n_2$ are constants, V is local growth velocity in meters per second, and G is the temperature gradient in degrees Kelvin per meter. Likewise, $$t_C = \frac{Ld_2^3}{\sigma T_0} \xi \sum_{i=1}^{N} \frac{m_i C_{ri}(1-k_i)}{D_{ii}} \tag{4}$$

where $t_c$ is local solidification time in seconds, L is the latent heat of the primary phase, $C_{ri}$ is the ith element composition near the secondary arm of size r in weight percent, $D_{ii}$ is the diagonal diffusion coefficient, $k_i$ is the solute distribution coefficient of the ith element; $m_i$ is the equilibrium liquidus slope for the ith element; ξ is a constant of the coarsening models, σ the interface free energy, $T_0$ is the liquidus temperature in degrees Kelvin at $C=C_0$ and N is the number of solute elements in a multi-component alloy. Furthermore, $$l = \frac{d_1}{2}(1 - \sqrt{1 - f_E}) \tag{5}$$

where $f_E$ is the eutectic volume fraction. Equation (5) relates the freezing conditions from Equation (1) to how much of the microstructure is comprised of the eutectic composite and dendrites respectively, as well as how far apart the eutectic composite regions are. Furthermore, $$a = \lambda \sqrt{f_{si}} \tag{6}$$

where $f_{si}$ is the silicon volume fraction in the eutectic. The eutectic composite is a mixture of hard particles in a softer metal matrix. Equation (6) relates the freezing conditions (via lambda) and composition (via $f_{si}$) to the spacing of the hard particles, which affects the mechanical response of the system. In addition, $$\lambda = C V_s^{-b} \tag{7}$$

where C and b are constants, and $V_s$ is the velocity of the solidus (or eutectic isotherm) in meters per second. A similar approach can be applied to cellular structure materials.

Results corresponding to predicted values of SDAS, microporosity distribution (including one or both of volume fraction and pore sizes) can be mapped to show in visual form the presence of such features through or across a cast component, such as an aluminum alloy engine block (not shown). In other words, the nano and microscale predictions are connected to the global scale by mapping the predicted values onto the part. Such data may also be compared to experimental data. The visual form (which may be color-coded, for example) may also be used for thermal data, such as cold shut defects predicted in a cast aluminum engine block. Likewise, a predicted dendritic structure can be used to compare against actual microstructures in transverse sections of such alloys, such as directionally solidified aluminum alloys.

The effect of a given volume fraction of defects (f) on the ultimate tensile strength ($\sigma_{UTS}$) and fracture strain ($\epsilon$) of a metal casting may be numerically described by the following two equations:

$$\sigma_{UTS} = \sigma_{UTS0}(1 - f)^n \tag{8}$$

$$\epsilon = \epsilon_0 (1 - f)^m \tag{9}$$

where $\sigma_{UTS0}$ and $\epsilon_0$ are ultimate tensile strength and elongation of defect-free material, respectively, while n and m are sensitivities of ultimate tensile strength and elongation to defect, respectively. The strength model of the present invention directly relates the strength of the part to the local microscale features, as will be discussed in more detail in Equations 10 and 11 below. The elongation of defect-free material can be calculated by:

$$\epsilon_0 = \tag{10}$$
$$0.5 + \epsilon_c^* - \left(\sigma_{YS} + \frac{1.6 \mu_p f_{uc} \epsilon_c^*}{\mu_p - 0.4(\mu_p - \mu_m)} \int_0^\infty \alpha(d(f(\alpha)) - d(f_c(\alpha))) \right) /$$
$$\left( bC(1 + \sqrt{f_{uc}}) \mu_m \left( \frac{C_1}{L} + \frac{C_2}{\lambda} \right) \right)$$

while the ultimate tensile strength of defect-free material, $\sigma_{UTS0}$ can be calculated by:

$$\sigma_{UTS0} = \sigma_{YS} + \frac{1.6 \mu_p f_{uc} \epsilon_c^*}{\mu_p - 0.4(\mu_p - \mu_m)} \int_0^\infty \alpha \cdot (d(f(\alpha)) - d(f_c(\alpha))) + \tag{11}$$
$$C(1 + \sqrt{f_{uc}}) \mu_m \sqrt{b \left( \frac{C_1}{L} + \frac{C_2}{\lambda} \right)(\epsilon_0 - \epsilon_c^*)}$$

where $\sigma_{YS}$ is the yield strength, $\mu_p$ is the shear modulus for the particles, $\mu_m$ is the shear modulus for the matrix, $\epsilon_c^*$ is the upper limit for the no plastic relaxation regime (0.007), b is the magnitude of the Burgers vector of the dislocations, α is aspect ratio of a particle, $f(\alpha)$ and $f_c(\alpha)$ are Weibull cumulative distribution functions of total and cracked particle aspect ratios, respectively, $d(f(\alpha))$ and $d(f_c(\alpha))$ are differentials of Weibull cumulative distribution functions of total and cracked particle aspect ratios (equal to the probability distribution functions of total and cracked particle aspect ratios), $f_{uc}$ is the volume fraction of uncracked particles, L is the average slip distance of dislocations in the matrix at the nanoscale level, λ is the aforementioned SDAS and C and $C_1$ are constants. In one form, C is approximately 1.25, $C_1/L$ is approximately 0.05 $\mu m^{-1}$ and $C_2$ is 2. As such, the behavior of interfaces between individual microstructural constituents making up a composite are valuable in that tensile failure may arise out of the combined effects of breaking the reinforcement particles or otherwise separating the reinforcement particles from the eutectic matrix in situations where the interface strength is too low. Likewise, fatigue failure modes depend on the relative strength of the interfaces to the constituents.

The creep behavior of metal castings may be expressed by a power law model:

$$\frac{d\epsilon_{creep}}{dt} = \beta \sigma^p t^m \tag{12}$$

$$\epsilon_{creep} = \beta \frac{1}{m+1} \sigma^p t^{m+1} \tag{13}$$

where σ is the equivalent stress, t is time and β, p and m are temperature-dependent parameters that may be obtained by best fitting experimental data or may be related to microstructure characteristics. Based on the tensile creep data from a representative specimen (in particular, aluminum alloy A380-T5), three parameters are determined for various stress levels, temperatures, and microstructure characteristics such as volume fraction of porosity and oxides, dendrite arm spacing, volume fraction of eutectic particles, and aluminum matrix strength or the like. Using these multi-microstructural scale dependent parameters, the calculated creep strain can be used as a failure criterion in the durability assessment.

In a similar manner, the fatigue life of metal castings may be estimated using:

$$N_f = a \left( \frac{\Delta \epsilon}{2} \right)^c \tag{14}$$

where a and c are material constants that may be determined empirically from testing data or theoretically related to microstructure characteristics. The fatigue life of metal castings may be estimated in other ways, such as through using multiscale fatigue life models like those described in U.S. Pat. No. 7,623,973, which is owned by the Assignee of the present invention and hereby incorporated by reference in its entirety. Likewise, the fatigue life (particularly in very high cycle fatigue regimes) of metal castings may be estimated using a modified random fatigue limit model, such as that described in US Published Application 2010-0030537 that is owned by the Assignee of the present invention and hereby incorporated by reference in its entirety. In a similar manner, the fatigue life of metal castings under multiaxial fatigue may be estimated using methods described in US Published Application 2010-023520 that is likewise owned by the Assignee of the present invention and incorporated by reference in its entirety. The present approach, when used in conjunction with various fatigue methods, is further beneficial. Examples of such methods for finding fatigue and related life issues can be found in co-pending published applications US 2009-0276166 and US 2010-0030537 that are likewise owned by the Assignee of the present invention and incorporated by reference in their entirety.

Predictions of individual component performance can be extrapolated to predict component reliability 460. Such an approach is especially valuable when large numbers of the same component are mass-produced, as it allows the manufacturer to readily determine if the contemplated component will be in accordance with warranty predictions for a given application. In one such embodiment of the analysis of reliability 460 that is particular to automotive applications, fatigue life calculations such as those discussed above can be made using statistical distributions of the service loads representing various driving styles and porosity populations to estimate the expected number of like parts produced during a given model year which fail prior to the design life. Similarly, expected warranty rates for like components subjected to new operating conditions can be predicted by updating the service load and temperature distributions and recomputing the tensile, creep, and fatigue failure probabilities. One such example of a new operating condition that may be determined could occur when an engine designed for typical United States speed and travel conditions is exported to another country (for example, Germany) where local laws may permit higher operating speeds (for example, under highway conditions). Such reliability 460 calculations can also be used to evaluate the business case for process improvements requiring capital investment by adjusting the defect population to represent the new process and determining if the proposed improvement provides enough benefit to justify its implementation for a particular product line.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation, and as such may represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method of computationally simulating a casting process for a lightweight metal alloy-based component, said method comprising:
    configuring a computer to comprise a data input, a data output, a processing unit, a memory unit and a communication path for cooperation between said data input, said data output, said processing unit and said memory unit; and
    operating said computer with a plurality of computation modules programmably cooperative with at least one of said memory unit and said processing unit such that upon receipt of data pertaining to said component, said computer subjects said data to said plurality of computation modules such that output therefrom provides performance indicia of said casting process, said plurality of computation modules comprising:
        a casting design module configured to provide an optimized geometric representation of said component;
        a process optimization module configured to determine at least one of a casting process, heat treating and machining of said final casting design;
        a multiscale microstructure prediction module configured to accept as input thereto data from said casting design module and said process optimization module in order to produce as output material characteristics, defect population estimates for a plurality of defect types, and microstructural architecture over a plurality of size scales; and
        a structure performance module configured to accept said material characteristics, defect population estimates and microstructural architecture output along with loading conditions, a predicted residual stress and distortion and a durability test simulation to produce said performance indicia.

2. The method of claim 1, wherein said plurality of defect types comprises oxide films, inclusions, entrained gas, cold shuts, core gas, entrained pre-formed metal skin, macroporosity and microporosity.

3. The method of claim 2, wherein said oxide films comprise at least one of bifilms, flow marks, cold shuts and folds.

4. The method of claim 1, wherein said multiscale microstructure prediction module provides quantitative indicia of at least one of dendrite arm spacing, volume fraction and sizes of second phases of said microstructural architecture.

5. The method of claim 4, wherein said microstructural architecture comprises at least one of primary dendrites, eutectic particles and eutectic matrix.

6. The method of claim 1, wherein said multiscale microstructure prediction module simulates the formation of precipitates and analyzes a volume fraction and size distribution of nanoscale precipitates in at least one of primary dendrites and a eutectic matrix.

7. The method of claim 1, wherein said plurality of size scales comprises a large scale that extends from between about ten millimeters to about one meter, an intermediate scale that extends from between about one micrometer to about ten millimeters and a small scale that extends from between about one tenth of a nanometer to about one micrometer.

8. The method of claim 7, wherein a database of property values generated at said small scale is based on non-uniform properties that have been extrapolated to at least one of the larger scales such that relationships generated between multiscale microstructure characteristics and local non-uniform properties and solidification conditions may be used without running a small scale simulation for a substantial entirety of said component.

9. The method of claim 8, wherein said multiscale microstructure characteristics are used by said structure performance module to predict local mechanical properties.

10. The method of claim 1, wherein said structure performance module analyzes the strengths of dendritic matrix material and eutectic matrix material based on predicted nanoscale precipitates that are a portion of said microstructural architecture over a plurality of size scales.

11. The method of claim 10, wherein said structure performance module analyzes said component as a composite of eutectic reinforcement particles, eutectic matrix materials and a dendrite matrix material such that a structural response of said composite is based on an integration of structural property predicted values of individual microstructural constituents as well as the behavior of interfaces between said individual microstructural constituents making up said composite.

12. The method of claim 1, wherein said computer system comprises an expert system for use with at least one of said casting design module and said process optimization module, said expert system comprising a knowledge base, geometry analyzer and inference engine.

13. The method of claim 1, wherein said component is made from a material selected from the group consisting of aluminum-based and magnesium-based alloys.

14. The method of claim 13, wherein said component is an automotive component.

15. The method of claim 1, wherein said material characteristics, defect population estimates and microstructural architecture output comprises a multiscale microstructure prediction of at least one of predicted microstructural constituents and multiscale defects.

16. The method of claim 1, wherein said operating said computer comprises operating said structure performance module to determine creep resistance.

17. The method of claim 1, further comprising a multiscale defect and microstructure dependent creep resistance analysis cooperative with said casting design module, said process modeling and optimization module and said multiscale microstructure prediction module.

18. The method of claim 1, further comprising a multiscale defect and microstructure dependent fatigue analysis cooperative with said casting design module, said process modeling and optimization module and said multiscale microstructure prediction module.

19. The method of claim 1, further comprising a multiscale defect and microstructure dependent tensile failure assessment cooperative with said casting design module, said process modeling and optimization module and said multiscale microstructure prediction module.

20. The method of claim 1, further comprising conducting a reliability analysis with said structure performance module.

21. The method of claim 1, wherein output from said multiscale microstructure prediction module further comprises a quantitative prediction of macro and micro defect results comprising oxide films, inclusions, entrained gases, cold shuts, core gas, entrained pre-formed metal skin, macroporosity and microporosity throughout a substantial entirety of said cast component.

22. The method of claim 21, wherein said macro and micro defects further comprise oxide bifilms that form when oxide films from adjacent streams meet at large angles.

23. The method of claim 21, wherein said macro and micro defects further comprise flow marks.

24. The method of claim 21, wherein said macro and micro defects further comprise cold shuts.

25. The method of claim 21, wherein said casting process being simulated models macro and micro defects that comprise gas bubbles.

26. The method of claim 25, wherein said gas bubbles are modeled as being produced by at least one of water vapor, carbon dioxide and pyrolysis products from heated chemical binders in said casting process.

27. The method of claim 21, wherein said macro and micro defects further comprise entrained gas bubbles formed during mold filling process.

28. The method of claim 21, wherein said microporosity is predicted by integrating an interdendritic flow model and a pore growth model where pore growth due to hydrogen diffusion from liquid metal is calculated according to the following equations:

$$\frac{\partial \rho C_H}{\partial t} = \nabla(D_H \nabla C_H) + S_H$$

$$S_H = \frac{\partial}{\partial t}\left(C_H^0 \Big/ \left(1 - \left(1 - \frac{K_s}{K_l}\right)\cdot f_s\right)\right)$$

with boundary conditions represented by a first hydrogen concentration in said liquid metal at a pore interface that is in equilibrium with a hydrogen gas pressure in a pore, and a zero flux of hydrogen at an outer radius of a calculated mushy zone.

29. A method of computationally simulating a casting process for a lightweight metal-based component, said method comprising:

configuring a computer to comprise a data input, a data output, a processing unit, a memory unit and a communication path configured to establish cooperation between said data input, said data output, said processing unit and said memory unit;

inputting into said computer geometric and property requirements corresponding to said component;

operating a casting design module to determine a casting geometry and gating/riser model with material and process recommendations, said casting design module configured to utilize at least one of material selection, casting process selection, casting design rules, component design and casting parameter selection during said casting design module operating;

transferring information pertaining to said material and process recommendations to a process modeling and optimization module;

operating said process modeling and optimization module to determine at least one of process improvement opportunities, optimal process practice and residual stress and distortion prediction, said process modeling and optimization module configured to utilize at least one of materials database, mold/die design and process control, melt quality control, mold filling practice and solidification control, heat treatment modeling and optimization and machining optimization and control during said process modeling and optimization module operating;

transferring information pertaining to said at least one of process improvement opportunities, optimal process practice and residual stress and distortion prediction to a multiscale microstructure prediction module;

operating said multiscale microstructure prediction module to determine microstructural constituents, said multiscale microstructure prediction module configured to utilize at least one of materials database, boundary conditions, multiscale phase prediction, defect predictions, microscale second phase particle prediction and nanoscale precipitate prediction during said multiscale microstructure prediction module operating;

transferring information pertaining to said microstructural constituents to a structure performance module;

operating said structure performance module to determine a performance prediction, said structure performance module configured to utilize at least one of materials database, tensile failure analysis, creep resistance analysis and multiscale fatigue analysis; and comparing said performance prediction against predetermined criteria such that upon satisfying said predetermined criteria, said simulated casting process defines an optimized process, or upon not satisfying said predetermined criteria, a product geometry redesign is submitted to at least one of said casting design module, said process modeling and optimization module, said multiscale microstructure prediction module and said structure performance module for generation of an updated performance prediction.

30. The method of claim 29, wherein at least one of said casting design module, process modeling and optimization module, multiscale microstructure prediction module and structure performance module employ an expert system to produce respective output therefrom.

31. The method of claim 29, wherein output from said multiscale microstructure prediction module further comprises quantitative indicia of macro and micro defect results throughout a substantial entirety of said cast component.

32. The method of claim 31, wherein said quantitative indicia of macro and micro defect results comprises quantitative indicia of oxide films, inclusions, entrained gases, cold shuts, core gas, entrained pre-formed metal skin, macroporosity and microporosity.

33. The method of claim 29, wherein said multiscale microstructure prediction module provides quantitative indicia of at least one of dendrite arm spacing, volume fraction and sizes of second phases of said microstructural constituents.

34. The method of claim 33, wherein said microstructural constituents comprises at least one of primary dendrites, eutectic particles and eutectic matrix.

35. The method of claim 29, wherein said multiscale microstructure prediction module simulates the formation of precipitates and analyzes a volume fraction and size distribution of nanoscale precipitates in at least one of primary dendrites and a eutectic matrix.

* * * * *